US011081104B1

(12) United States Patent
Su et al.

(10) Patent No.: US 11,081,104 B1
(45) Date of Patent: Aug. 3, 2021

(54) CONTEXTUAL NATURAL LANGUAGE PROCESSING

(71) Applicant: Amazon Technologies, Inc., Seattle, WA (US)

(72) Inventors: Chengwei Su, Belmont, MA (US); Sankaranarayanan Ananthakrishnan, Belmont, MA (US); Spyridon Matsoukas, Hopkinton, MA (US); Shirin Saleem, Belmont, MA (US); Rahul Gupta, Cambridge, MA (US); Kavya Ravikumar, Mercer Island, WA (US); John Will Crimmins, Seattle, WA (US); Kelly James Vanee, Shoreline, WA (US); John Pelak, Harvard, MA (US); Melanie Chie Bomke Gens, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 15/838,917

(22) Filed: Dec. 12, 2017

Related U.S. Application Data

(63) Continuation-in-part of application No. 15/634,711, filed on Jun. 27, 2017, now abandoned.

(51) Int. Cl.
*G10L 15/18* (2013.01)
*G10L 15/22* (2006.01)
(Continued)

(52) U.S. Cl.
CPC .......... *G10L 15/063* (2013.01); *G06F 16/313* (2019.01); *G06F 40/295* (2020.01);
(Continued)

(58) Field of Classification Search
CPC ... G10L 15/1815; G10L 15/22; G10L 15/063; G06F 17/2785
See application file for complete search history.

(56) References Cited

U.S. PATENT DOCUMENTS

| 10,509,829 B2* | 12/2019 | Rambhia ................ G10L 17/005 |
| 2013/0144890 A1* | 6/2013 | Liu .......................... G06F 16/35 |
| | | 707/749 |
| 2014/0163959 A1* | 6/2014 | Hebert ................. G06F 16/3344 |
| | | 704/9 |
| 2014/0176708 A1* | 6/2014 | Ramakrishnan ....... G06K 9/624 |
| | | 348/143 |

(Continued)

*Primary Examiner* — Bryan S Blankenagel
(74) *Attorney, Agent, or Firm* — Pierce Atwood LLP

(57) ABSTRACT

A natural language understanding system that can determine an overall score for a natural language hypothesis using hypothesis-specific component scores from different aspects of NLU processing as well as context data describing the context surrounding the utterance corresponding to the natural language hypotheses. The individual component scores may be input into a feature vector at a location corresponding to a type of a device captured by the utterance. Other locations in the feature vector corresponding to other device types may be populated with zero values. The feature vector may also be populated with other values represent other context data. The feature vector may then be multiplied by a weight vector comprising trained weights corresponding to the feature vector positions to determine a new overall score for each hypothesis, where the overall score incorporates the impact of the context data. Natural language hypotheses can be ranked using their respective new overall scores.

32 Claims, 18 Drawing Sheets

(51) Int. Cl.
  *G10L 15/06* (2013.01)
  *G10L 15/183* (2013.01)
  *H04L 29/08* (2006.01)
  *G10L 15/32* (2013.01)
  *G06K 9/00* (2006.01)
  *H04W 4/02* (2018.01)
  *G10L 15/26* (2006.01)
  *G06F 16/31* (2019.01)
  *G06F 40/295* (2020.01)

(52) U.S. Cl.
  CPC ........ *G06K 9/00456* (2013.01); *G10L 15/183* (2013.01); *G10L 15/1815* (2013.01); *G10L 15/22* (2013.01); *G10L 15/26* (2013.01); *G10L 15/32* (2013.01); *H04L 67/306* (2013.01); *H04W 4/02* (2013.01)

(56) References Cited

U.S. PATENT DOCUMENTS

| | | | | |
|---|---|---|---|---|
| 2014/0309990 | A1* | 10/2014 | Gandrabur | G10L 15/1815 704/9 |
| 2015/0269934 | A1* | 9/2015 | Biadsy | G10L 15/197 704/235 |
| 2016/0210363 | A1* | 7/2016 | Rambhia | G06F 3/0482 |
| 2017/0068655 | A1* | 3/2017 | Wang | G06F 17/277 |
| 2017/0244779 | A1* | 8/2017 | Reichling | G06F 3/0482 |
| 2017/0372694 | A1* | 12/2017 | Ushio | G06N 3/084 |
| 2018/0068661 | A1* | 3/2018 | Printz | G10L 15/19 |
| 2018/0247221 | A1* | 8/2018 | Park | G06F 17/27 |
| 2018/0374486 | A1* | 12/2018 | Zhao | G10L 15/16 |
| 2019/0340456 | A1* | 11/2019 | Odashima | G06K 9/00214 |
| 2019/0347265 | A1* | 11/2019 | Behal | G06F 16/953 |

* cited by examiner

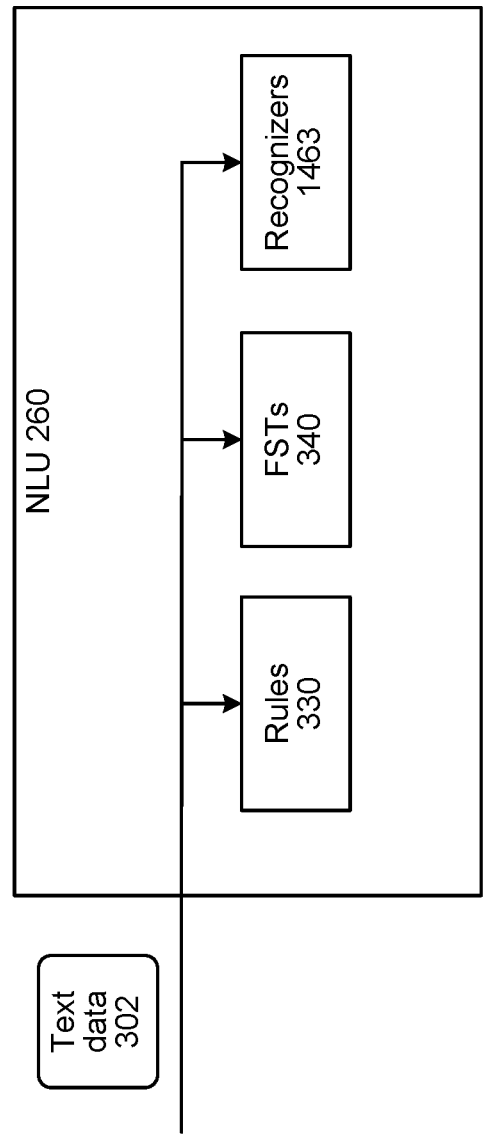

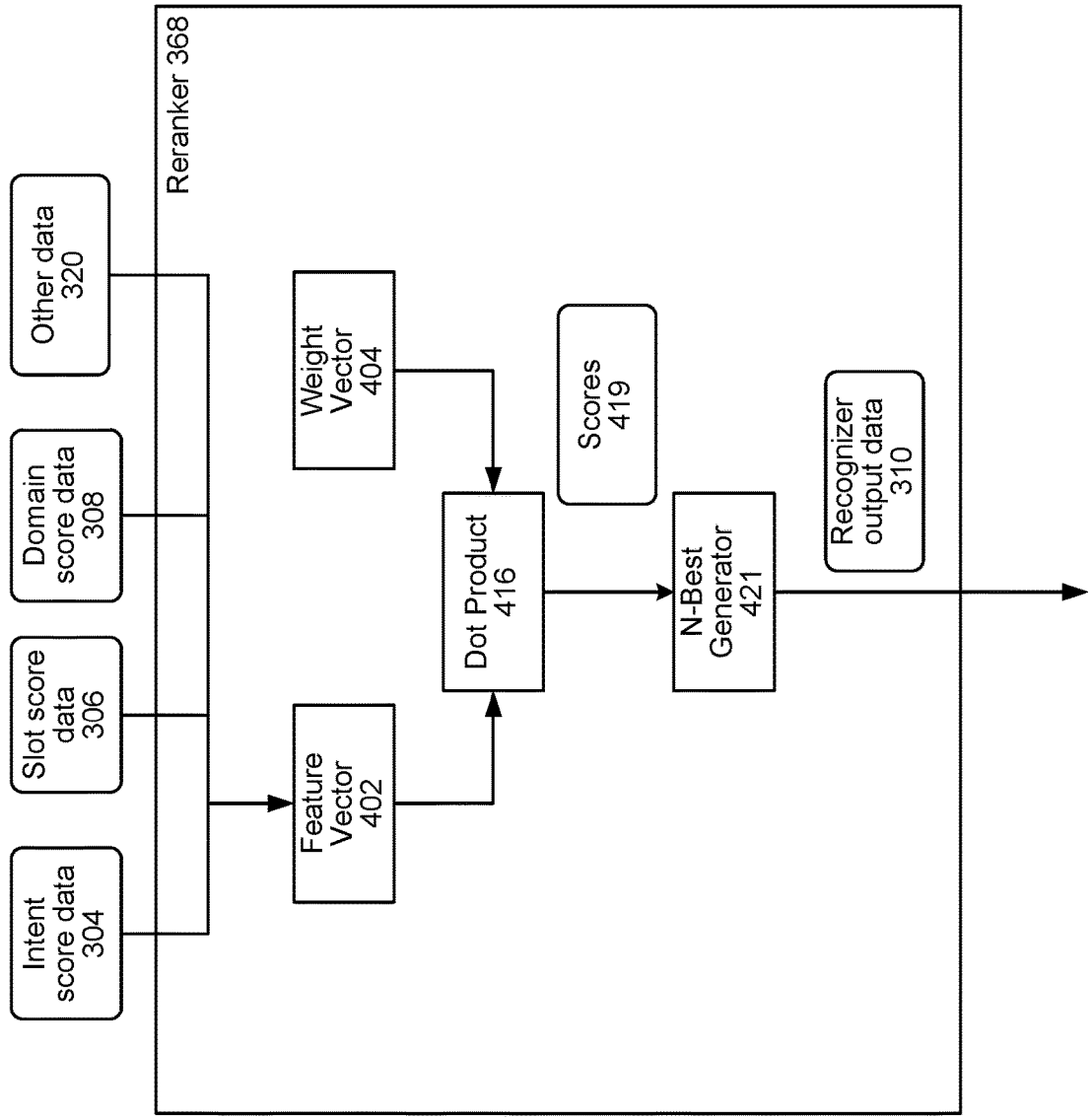

CONTEXTUAL NATURAL LANGUAGE PROCESSING

CROSS REFERENCE TO RELATED APPLICATION

This application is a continuation-in-part of, and claims priority to, U.S. patent application Ser. No. 15/634,711 entitled "Natural Language Processing," filed on Jun. 27, 2017, in the names of Rahul Gupta, et al., the entirety of which is hereby incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 3A and 3B are conceptual diagrams of NLU components according to embodiments of the present disclosure.

FIG. 4 is a conceptual diagram of a reranker component according to embodiments of the present disclosure.

DETAILED DESCRIPTION

Figure 1:
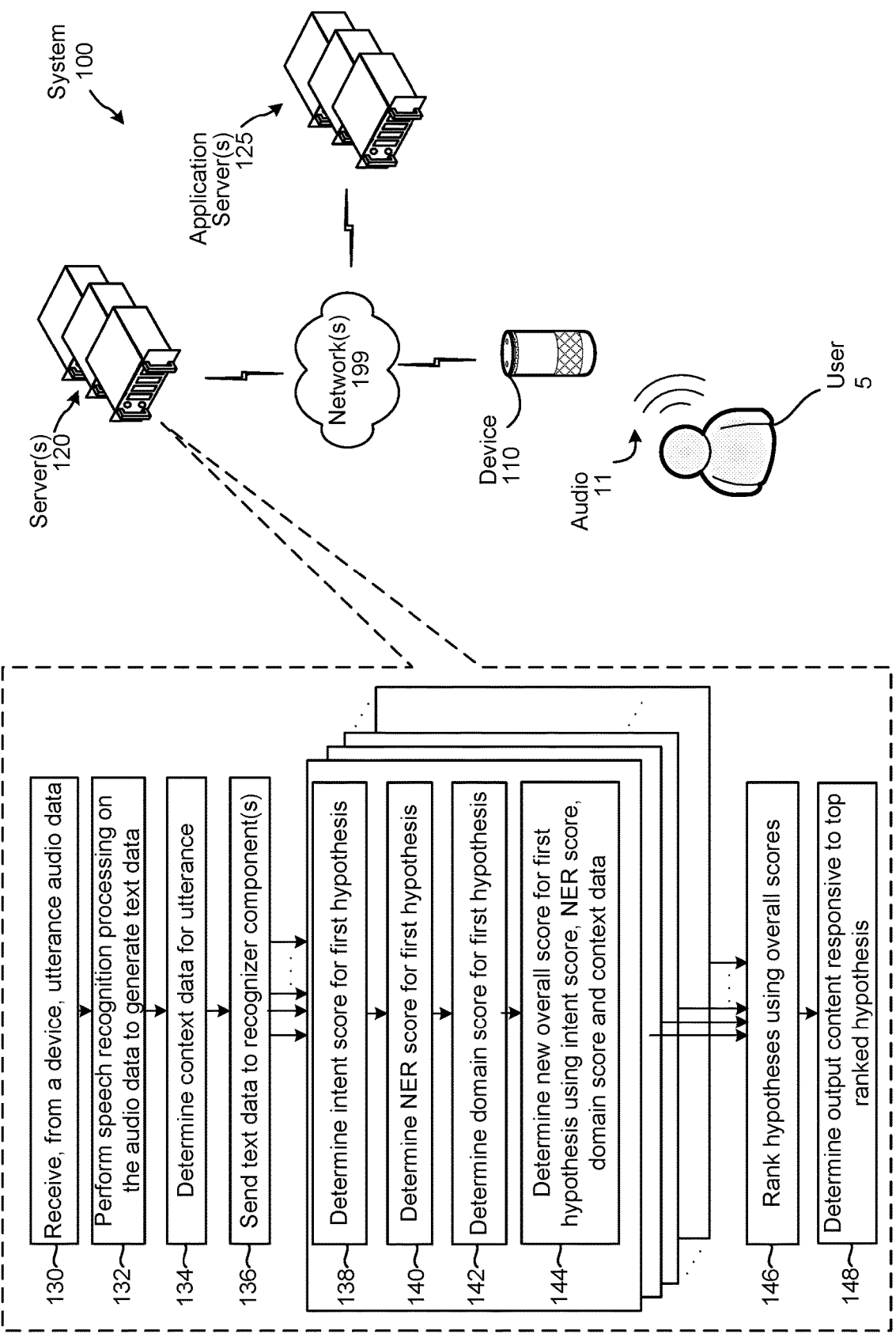
FIG. 1 illustrates a system configured to perform natural language understanding processing on a decoupled domain level according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A system may be configured to execute one or more commands included in a spoken utterance. To figure out what command to execute, as part of NLU processing the system may attempt to assign a domain to the utterance. The system may be configured with multiple domains, with each domain being associated with a set of functionalities corresponding to an application. For example, one domain may correspond to the weather, one domain may correspond to music, one domain may correspond to videos, one domain may correspond to shopping, etc. ASR processing may result in different potential textual interpretations for an utterance. For each domain, the system may determine different potential intents that may go with a particular textual interpretation (e.g., potential transcription) of the utterance. An intent is an interpretation of what command the requesting user wants the system to take in response to the utterance. For example, for a textual interpretation corresponding to "what's the weather today in Seattle," the system may determine the textual interpretation potentially corresponds to a "get weather" intent and/or a "short weather detail" intent. For each domain, the system may also determine portions of each textual interpretation that may correspond to text needed to execute the command, such as an entity related to the action. For example, for the textual interpretation of "what's the weather today in Seattle," the system may determine "today" potentially corresponds to an entity (the date the utterance was spoken) and "Seattle" potentially corresponds to an entity (the city of Seattle, Wash. for which the weather is being requested). The system may also determine confidence scores, with each confidence score indicating a likelihood that a given textual interpretation corresponds to a specific domain. The system may determine multiple different potential NLU interpretations for each textual interpretation of an utterance.

As each potential textual interpretation (sometimes referred to as an ASR hypothesis) may have multiple different NLU interpretations (sometimes referred to as an NLU hypothesis), the system may perform additional processing to determine which potential NLU hypothesis is correct. Each NLU hypothesis may include respective NLU result data such as intent, intent score, entity text, named entity score, domain score, or other data. For illustration purposes, discussions herein relating to a hypothesis will generally refer to an NLU hypothesis unless otherwise noted.

To try to determine the correct domain, intent(s), entities, etc. of an utterance, the system may rank the individual NLU hypotheses using the NLU result data associated with each NLU hypothesis, e.g., using the determined intents for each hypothesis, the potential entities for each hypothesis, and the confidence scores of the hypothesis (where the confidence score is an ASR confidence, a confidence that the hypothesis belongs with a specific domain, or some other score). Thus the system may rank the hypotheses according to their corresponding NLU results (e.g., intent scores, entity scores, domain confidences, etc.). The ranking may result in a new overall score being assigned to each hypothesis where the new score may be used to determine an individual hypothesis' rank relative to other hypotheses. This is done so that the system may determine the most correct NLU results for the particular utterance. The ranking of hypotheses may be done on a domain-by-domain basis, where the NLU interpretations for a particular domain are compared against each other to determine a ranked list of hypotheses for each domain. The system may then rank different scores across domains to figure out the best interpretation of the utterance, within the domain/intent/entity NLU structure of the system. The top scoring NLU results (including indications of domain, intent, entities and/or other information) may then be used to execute a command for the utterance and identify content responsive to the utterance. Alternatively, the hypotheses for multiple domains may be compared against each other in a multi-domain arrangement. As described below, the component that takes NLU results and ranks hypotheses accordingly may be called a reranker. The reranker may input a variety of NLU results and corresponding scores and may assign a new score to each hypothesis so the hypotheses may be ranked against each other. The reranker may be a trained model configured to input data regarding individual NLU hypotheses as well as context data. The trained model may be linear model, such as a log-linear model, or may be a non-linear model such as a neural network or the like.

As detailed above, the reranker that determines the new scores for each hypothesis and then rank the hypotheses according to their new scores may operate across domains (i.e., the components perform processes with respect to multiple domains). Thus, rankers may be trained using data specific to multiple domains thus enabling a single component to perform internal scoring and ranking across multiple domains. While this configuration may be desirable to enable a component to provide a multi-domain approach when processing data for a particular incoming utterance, it can create complications when training or re-training models used by the component as any change to the system's capability when adding or deleting domains, intents, entities, etc. can require a complete re-training of the respective multi-domain component(s). Thus, for example, if data for processing utterances with regard to one domain is updated, the system may need to retrain a multi-domain component that is configured to handle many other, non-updated, domains. Updating multi-domain components in this manner can be undesirable as it may involve continual retraining as different domains are regularly updated independent of each other. Further, system performance may be impacted as retraining of a model/component for one domain may result in undesirable performance changes with respect to another domain when operating the retrained model/component.

The system may thus implement domain-specific components, where each component determines confidence scores with respect to a single domain and ranks determinations of the system made with respect a single domain. Each domain of the system may be configured with a component that determines confidence scores representing a likelihood that the post ASR textual interpretations correspond to the domain. Each domain of the system is also configured with a component that ranks textual interpretations determined by the system, intents for each textual interpretation associated with the domain, potential entities for each textual interpretation for the domain, and the confidence scores associated with the domain. The individual domain components may be configured to output scores that are normalized relative to a multi-domain scale so that a multi-domain ranking component can be employed to select one or more NLU results from across the multiple domains. By decoupling the confidence score and ranking components of the system from a multi-domain functionality to a single domain-by-domain functionality, the system of the present disclosure is able to perform updates with respect to one domain without affecting the performance of the system with respect to other domains.

In certain configuration, a speech processing system may be configured to process commands from a variety of different devices. For example, the system may process commands from a "smart speaker" device that captures utterances, sends corresponding data to the servers for processing, and then outputs audio (such as music playback) called for in the utterance. The system may also process commands from a smart speaker device that has a screen and can be used for video calls, video playback, and other commands. The system may also process commands from a headless device such as a small media streaming device that is configured to output audio and/or video data from other devices connected to the headless device.

Because each such device may be operated by a user in a slightly different manner, the system may be more likely to receive one group of commands from one type of device while being more likely to receive a different group of commands from another type of device. Thus, it may be desirable for the system to interpret the same words differently if spoken to different devices. For example, a user may be more likely to intend for a device to play music when speaking a "play" command to a smart speaker but a user may be more likely to intend for a device to play a video when speaking a "play" command to a device that either has a screen or is connected to another device with a screen (e.g., a television). Thus, in order to most accurately process those commands, it may be desirable for the system to process utterances from one device type differently from utterances from another device type, particularly with regard to NLU processing that interprets the text of the utterance.

One technique for considering device type in NLU processing is to configure different reranker components for each device. Each such device specific reranker may incorporate a machine learning component that is trained on utterances (and corresponding ground truth data) that correspond to the specific device. Thus, a reranker to be used for utterances received from a smart speaker (e.g., an Amazon Echo) may be trained on sample utterance data for utterances received from a smart speaker. Similarly, a reranker to be used for utterances received from a device with a screen (e.g., an Amazon Echo Show) may be trained on sample utterance data for utterances received from a device with a screen. In order to operate such rerankers in a domain-specific context, however, a different reranker would be configured for each device for each domain. Thus, if the system is configured with Y number of domains and is configured to handle utterances spoken to N number of device types, the system may operate Y×N different rerankers. This may not be desirable given the computing resources needed to train, retrain, and operate at runtime so many rerankers. Further, every time the system added a new device capable of communicating with the system, Y new rerankers would need to be created and incorporated (one for the new device for each domain), thus adding further complexity to incorporating new devices to the system.

Thus, offered is a new reranker, one that can be trained on a large universe of training utterances that correspond to multiple device types. The system may be configured to determine the capabilities of the utterance's originating device and pass some indication of those capabilities to the reranker so that it may consider the device type in its processing. For example, a feature vector may be configured where the feature vector is a data structure representing NLU results for different device types. At runtime, the portion of the feature vector corresponding to the device type of the originating device may be populated with NLU result data and the remainder of the feature vector may be populated with zeros. Thus the reranker may process the feature vector using the appropriate trained data (e.g., trained weights of a log linear model) to properly interpret the NLU result data and output appropriate overall scores for the NLU hypotheses. One such device agnostic reranker may be trained for each domain. Or the device agnostic reranker may be implemented universally across domains.

FIG. 1 illustrates a system 100 configured to perform natural language understanding. Although the figures and discussion illustrate certain operational steps of the system 100 in a particular order, the steps described may be performed in a different order (as well as certain steps removed or added) without departing from the intent of the disclosure. As illustrated in FIG. 1, a device(s) 110 local to a user 5, a server(s) 120, and an application server(s) 125 may be connected across a network(s) 199. The server(s) 120 (which may be one or more different physical devices) may be capable of performing traditional speech processing (e.g., speech recognition processing such as ASR, natural language understanding such as NLU, command processing, etc.) as well as other operations. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.). The system 100 may include service provider devices (e.g., application server(s) 125), or the like.

As illustrated in FIG. 1, a device 110 may capture audio 11 including a spoken utterance of a user 5 via a microphone or microphone array of the device 110. The device 110 generates audio data corresponding to the captured audio 11, and sends the audio data to the server(s) 120 for processing.

The server(s) 120 receives (130) the audio data from the device 110. The server(s) 120 performs (132) speech recognition processing (e.g., ASR) on the audio data to generate text data representing at least one textual interpretation corresponding to the utterance. Alternatively, rather than the server(s) 120 receiving audio data and performing speech recognition processing on the audio data to generate the text data, the server(s) 120 may receive the text data from a device. For example, a user may input (via a keyboard) text into a computing device. Text data corresponding to the text may then be sent to the server(s) 120. The server(s) 120 may then perform NLU on the text data to generate the NLU results.

The server(s) 120 may then determine (134) context data corresponding to the utterance. The context data may include a variety of different data signals corresponding to data point such as the device ID, device hardware capability, user information or other data as described below. The context data may be used, as described below, to select a context profile that corresponds to the context data.

The server(s) 120 may then send (136) the text data to one or more different recognizer component(s). The recognizer component(s) may be domain-specific. The domain-specific recognizer component(s) may operate on server(s) 120 and may be configured to process the text data with regard to a specific domain. That is, one set of recognizer components may be configured to process the text data with regard to how the text data may correspond to a first domain, another set of recognizer components may be configured to process the text data with regard to how the text data may correspond to a second domain, and so forth. Each of the components may be individually trained for their specific respective domain so that processing the text data relative to one domain may be independent for the processing of the text data relative to a different domain.

The system may then determine multiple NLU hypotheses for the text data, where each hypothesis is associated with a set of NLU scores. For example, the system may determine (138) an intent score for a first hypothesis, determine (140) an named entity recognition (NER) score for the first hypothesis and determine (142) a domain score for the first hypothesis. The system can then determine (144) a new overall score for the first hypothesis using the first intent score, first NER score and first domain score. The new overall score may be determined based on the context data/context profile. The system may then repeat steps 138-144 for other hypotheses.

The server(s) 120 may then rank (146), the different hypotheses using the new overall scores. The server(s) 120 then determines (147) output content responsive to the top ranked hypothesis. The server(s) 120 may receive the content from a first party (1P) storage (e.g., one controlled or managed by the server(s) 120) or a third party (3P) storage (e.g., one managed by an application server(s) 125 in communication with the server(s) 120 but not controlled or managed by the server(s) 120). The server(s) 120 may then send the content to the device 110 (or another device indicated in a profile associated with the user 5), which in turn outputs audio corresponding to the content.

Figure 2:
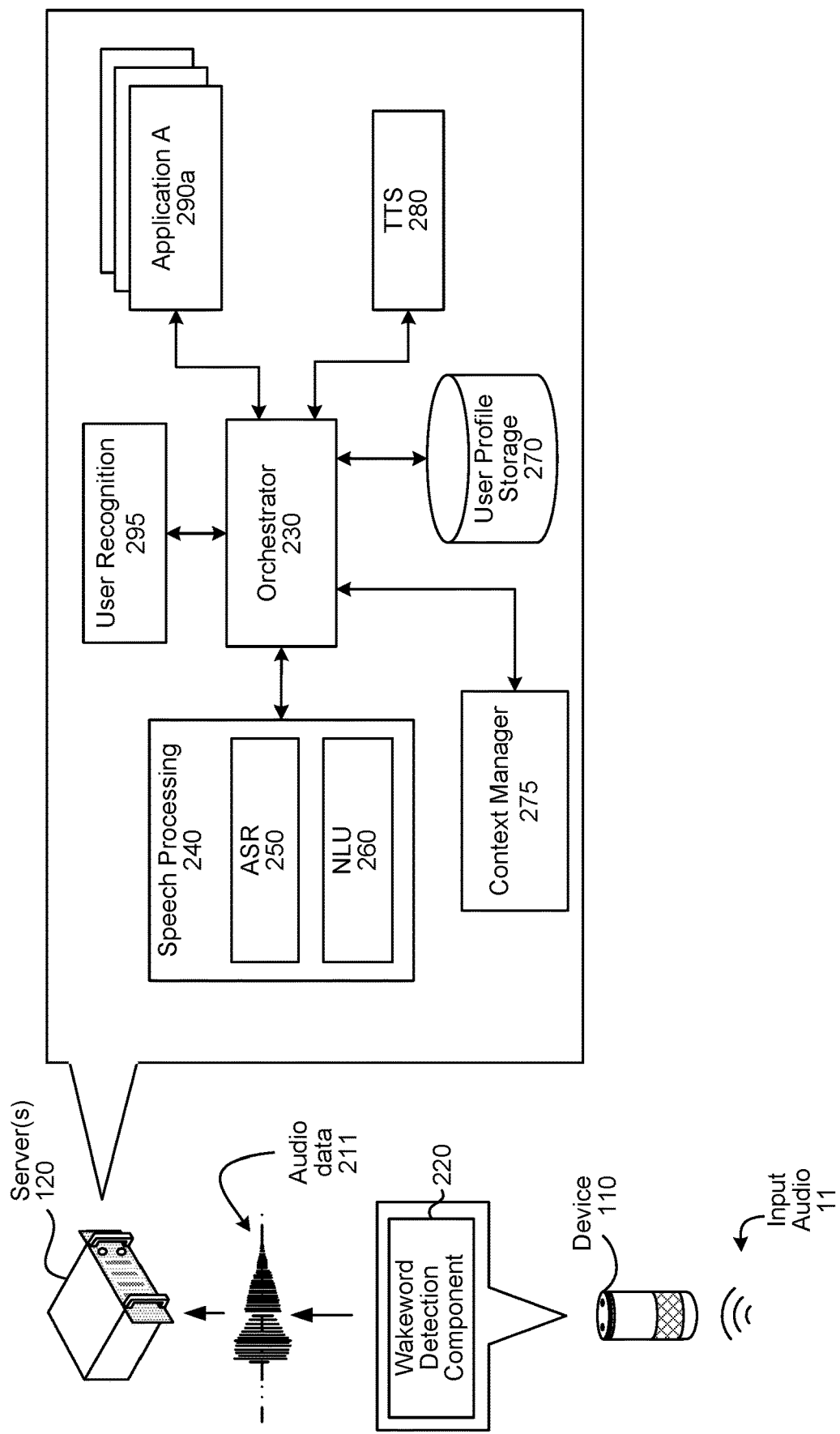
FIG. 2 is a diagram of components of a system according to embodiments of the present disclosure.

The system 100 may operate using various components as described in FIG. 2. The various components illustrated FIG. 2 may be located on a same or different physical devices. Communication between various components illustrated in FIG. 2 may occur directly or across a network(s) 199.

An audio capture component, such as a microphone or array of microphones of the device 110 or other device, captures the input audio 11 corresponding to a spoken utterance. The device 110, using a wakeword detection component 220, processes audio data corresponding to the input audio 11 to determine if a keyword (e.g., a wakeword) is detected in the audio data. Following detection of a wakeword, the device 110 sends audio data 211, corresponding to the utterance, to a server(s) 120 for processing.

Upon receipt by the server(s) 120, the audio data 211 may be sent to an orchestrator component 230. The orchestrator component 230 may include memory and logic that enables the orchestrator component 230 to transmit various pieces and forms of data to various components of the system 100.

The orchestrator component 230 sends the audio data 111 to a speech processing component 240. An ASR component 250 of the speech processing component 240 transcribes the audio data 111 into one more textual interpretations representing speech contained in the audio data 111. The ASR component 250 interprets the spoken utterance based on a similarity between the spoken utterance and pre-established language models. For example, the ASR component 250 may compare the audio data 111 with models for sounds (e.g., subword units or phonemes) and sequences of sounds to identify words that match the sequence of sounds spoken in the utterance represented in the audio data 111.

Results of ASR processing (i.e., one or more textual interpretations representing speech in text data 302 illustrated in the first instance in FIG. 3A) are processed by an NLU component 260 of the speech processing component 240. The text data 302 may include a top scoring textual interpretation or may include an N-best list including a group of textual interpretations and potentially their respective scores output by the ASR component 250. The NLU component 260 attempts to make a semantic interpretation of the speech represented in the text data. That is, the NLU component 260 determines one or more meanings associated with the speech represented in the text data based on individual words represented in the text data. The NLU component 260 interprets a text string to derive an intent of the user (e.g., an action that the user desires be performed) as well as pertinent pieces of information in the text data that allow a device (e.g., the device 110, the server(s) 120, the application server(s) 125, etc.) to complete the intent. For example, if the text data corresponds to "call mom," the NLU component 260 may determine the user intended to activate a telephone in his/her device and to initiate a call with a contact matching the entity "mom." As further described below, each textual interpretation may result in a number of different potential interpretations (NLU hypotheses) of the text, where each NLU hypothesis is a potential natural language interpretation of particular text. Each NLU hypothesis may include a potential intent, intent score, entity text, entity text score, domain score, or other data.

The server(s) 120 may include a user recognition component 295. The user recognition component 295 may take as input the audio data 211 as well as the text data output by the ASR component 250. The user recognition component 295 may receive the ASR output text data either directly from the ASR component 250 or indirectly from the ASR component 250 via the orchestrator component 230. Alternatively, the user recognition component 295 may be implemented as part of the ASR component 250. The user recognition component 295 determines scores indicating whether the utterance in the audio data 111 was spoken by particular users. For example, a first score may indicate a likelihood that the utterance was spoken by a first user, a second score may indicate a likelihood that the utterance was spoken by a second user, etc. The user recognition component 295 also determines an overall confidence regarding the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 to stored biometric data of users. User recognition may further involve comparing image data including a representation of at least a feature of a user with stored image data including representations of features of users. Other types of user recognition processes, including those known in the art, may also or alternatively be used. Output of the user recognition component may be used to inform NLU processing as well as processing performed by 1P and 3P applications.

The server(s) 120 may include a user profile storage 270. The user profile storage 270 includes data regarding user accounts. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. The user profile storage 270 may include a variety of information related to individual users, accounts, etc. that interact with the system 100.

The user profile storage 270 may include data regarding individual or group user accounts. In an example, the user profile storage 270 is a cloud-based storage. Each user profile may include data such as type of device data and location of device data for different devices. Each user profile may also include session ID data associated with respect session processing data. The session ID data may indicate the intent score data 304, the slot score data 306, and/or the domain score data 308 associated with various utterances. In addition, each user profile may include user settings, preferences, permissions (e.g., the intents associated with a specific domain that the user has enabled), etc. with respect to certain domains. Each user profile may additionally include user affinity data, such as occupation of the user, hobbies of the user, etc.

The system may also include a context manager 275 that takes data regarding the context of the particular utterance (e.g., the device type, device capabilities, user ID, or other data) and informs the appropriate components of the context data so the system can properly interpret the utterance in view of the utterance's context.

Output from NLU processing (e.g., text data including tags attributing meaning to the words and phrases represented in the text data), and optionally output from the user recognition component 295, context manager 275, and/or data from the user profile storage 270, may be sent to one or more applications 290 either directly or via the orchestrator component 230. FIG. 2 illustrates various 1P applications 290 of the system 100. However, it should be appreciated that the data sent to the 1P applications 290 may also be sent to 3P application servers 125 executing 3P applications.

An "application," as used herein, may be considered synonymous with a skill. A "skill" may correspond to a domain and may be software running on a server(s) 120 and akin to an application. That is, a skill may enable a server(s) 120 or application server(s) 125 to execute specific functionality in order to provide data or produce some other output requested by a user. The system 100 may be configured with more than one skill. For example a weather service skill may enable the server(s) 120 to execute a command with respect to a weather service server(s) 125, a car service skill may enable the server(s) 120 to execute a command with respect to a taxi service server(s) 125, an order pizza skill may enable the server(s) 120 to execute a command with respect to a restaurant server(s) 125, etc.

The application may be chosen based on the output of NLU processing. In an example, if the NLU output is associated with an intent to play music, the application selected may correspond to a music playing application. In another example, if the NLU output is associated with an intent to output weather information, the application selected may correspond to a weather application. In yet another example, if the NLU output corresponds to an intent to obtain search results, the application selected may correspond to a search engine application.

Output of the application may be in the form of text data to be conveyed to a user. As such, the application output text data may be sent to a TTS component 280 either directly or indirectly via the orchestrator component 230. The TTS component 280 may synthesize speech corresponding to the received text data. Speech audio data synthesized by the TTS component 280 may be sent to the device 110 (or another device) for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, parameters such as frequency, volume, and noise are varied by the TTS component 280 to create an artificial speech waveform output. Parametric synthesis uses a computerized voice generator, sometimes called a vocoder.

As noted above, text data 302 may be determined by the ASR component 250 and sent to an NLU component 260. The NLU component 260 may include one or more components that interpret the text data 302 to determine how the system may execute a command corresponding to the text data 302. As shown in FIG. 3A, the NLU component may have several different sub-components that can process the text data 302. One such component may include one or more rules 330. The rules component 330 may match the text data 302 to pre-established rules that indicate certain actions should be taken if the text data 302 meets certain conditions. The finite state transducer (FST) component 340 may use the text data 302 to traverse one or more FSTs to determine an action that should be taken using the text data. The recognizers 1463 may process the text data 302 using one more trained models to determine one or more NLU hypotheses representing different potential NLU interpretations of the text data 302. The rules 330, FSTs 340 and recognizers 1463 may operate in parallel or may operate in a priority order such that if the text data 302 satisfies one of the rules 330, the rules 330 will govern further actions for the text data 302. If the text data 302 does not satisfy one of the rules 330, the text data 302 may be sent to the FSTs 340 to determine if the FSTs 340 can interpret the text data 302. If the FSTs 340 cannot handle the text data 302, the text data 302 may be sent to the recognizers 1463 for processing. Other ordering of NLU processing may also be used.

The techniques may also be used together. For example, a set of rules, an FST, and a trained machine learning model may all operate on a textual interpretation substantially in parallel to determine the slots/intents associated therewith. If one technique performs its task with high enough confidence, the system may use the output of that technique over the others. The system may also prioritize the results of different techniques in certain circumstances. For example, rules results may be assign higher priority than FST results, which may be assigned higher priority than model results, or some other configuration.

Figure 3B:
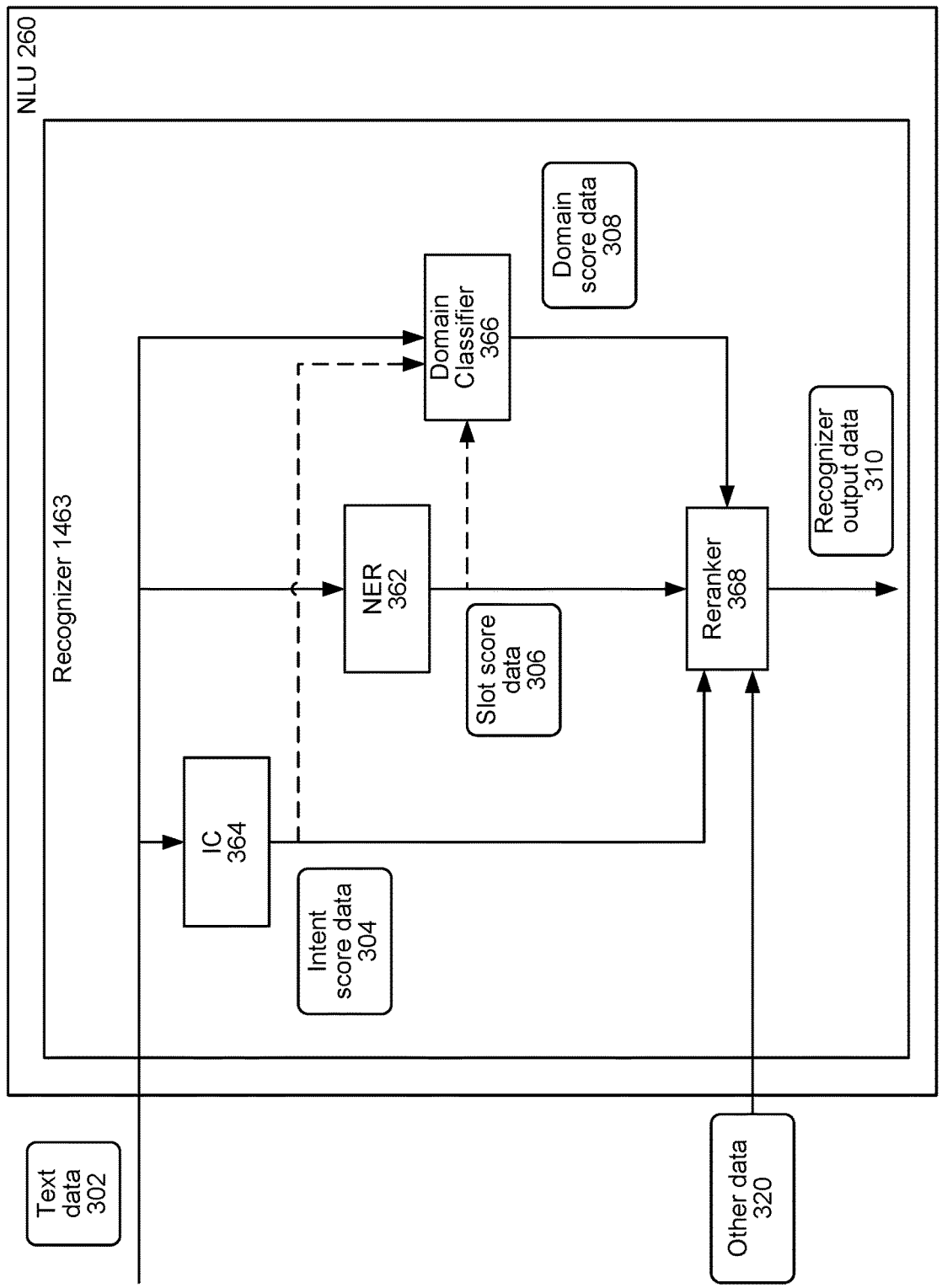

As detailed herein, the system 100 may include multiple domains. FIG. 3B illustrates components of a recognizer 1463 that may process text data 302. The example of FIG. 3B shows a recognizer 1463 that may operate with respect to single domain. For example, a recognizer 1463 may be configured to process incoming text data 302. The text data 302 may be received from an ASR component and may include one or more ASR hypotheses (e.g., textual interpretations) associated with an utterance. Alternatively, the text data 302 may be received from a device 110 with a text input, or through some other means. The recognizer 1463 may attempt to interpret the text data 302 with respect to a particular domain of the recognizer 1463. That is, the recognizer may process the text data to determine one or more scores corresponding to whether the text data likely corresponds to that particular domain. Each domain may be configured to also determine which service to call with respect to the utterance represented in the text data. For example, if the recognizer determines the utterance represented in the text data corresponds to a request to play a video, the recognizer may determine which video service to call to obtain the video content from.

Each domain may be associated with one or more intents corresponding to actions the user desires be performed for that domain. For example, a music domain may have intents such as play music, next song, volume up, etc. The number of intents associated with each domain may vary between domains and may be configurable. A particular recognizer 1463 (and its subsidiary components) may be trained for a single particular domain and the system may include multiple recognizers 1463, each configured to process the text data 302 relative to a single domain.

As can be appreciated, if an incoming utterance does correspond to a particular domain, the recognizer 1463 of that domain may output high scores (explained below) whereas if an incoming utterance does not correspond to a particular domain, the recognizer 1463 of that domain may output low scores (or vice versa depending on system configuration). As can also be appreciated, an incoming utterance may also receive similar scores from different domain recognizers depending on if the recognizer is trained to understand a particular utterance. For example, an utterance of "what's up in Seattle" may receive high scores for both a weather domain recognizer and for a news domain recognizer.

Each recognizer 1463 may include an intent classification (IC) component 364 that generates intent score data 304. The intent score data 304 may include one or more intent labels associated with the domain (e.g., for a music domain, "play music," "next song," etc.). Each intent label represented in the intent score data 304 may be associated with a confidence score representing the likelihood that the intent label (or the intent associated with the intent label) associated therewith is associated with the text data 302 input into the IC component 364. The IC component 364 may process each textual interpretation represented in the text data 302 to determine an intent(s) associated with the domain operating the IC component 364 to which the respective textual interpretation may relate, as well as a score for each intent indicating the likelihood that the particular intent is in fact related to the particular textual interpretation. For example, for a textual interpretation corresponding to "what's the weather today in Seattle," an IC component 364 operating with respect to a weather domain may tag the textual interpretation as corresponding to a "get weather" intent and/or a "short weather detail" intent. The IC component 364 may also assign a first score indicating a likelihood that the textual interpretation in fact corresponds to the "get weather" intent and assign a second score indicating a likelihood that the textual interpretation in fact corresponds to the "short weather detail" intent. Each score may be a binned designator (e.g., low, medium, high, or any other binned designator). Alternatively, each score may be a discrete value (e.g., 0.2, 0.5, 0.8, etc.). The IC component 364 may use a model, such as a maximum entropy classifier, to identify the intent(s) associated with each textual interpretation.

Each recognizer 1463 may also include a named entity resolution (NER) component 362 that generates slot score data 306. The slot score data 306 may include text representing one or more slots (e.g., portion of the text data 302), with each slot corresponding to a word or series of words in the text data 302 relevant to the domain. The slot score data 306 may additionally include an utterance level score. That is the score may represent a likelihood that the utterance represented in the text data 302 is relevant to the domain. According to an example, for a music domain, slots may correspond to text that potentially represents the artist name, album name, song name, etc. According to another example, for a weather domain, slots may correspond to time and location for the requested weather data. For example, an utterance of "what's the weather in Seattle tomorrow" the text "Seattle" may correspond to one slot and the text "tomorrow" may correspond to another slot. In addition, the NER component 362 may identify what type of slot corresponds to a given portion of text. For example, for the text "play songs by the stones," an NER component 362 trained with respect to a music domain may recognize the portion of text "the stones" corresponds to a slot, and correspondingly an artist name. However, the NER component 362 may not determine an actual entity to which the slotted text refers. This process, called entity resolution, may be handled by a downstream component, such as entity resolution component 1470 discussed below. Each score output by the NER component 362 may be a binned designator (e.g., low, medium, high, or any other binned designator). Alternatively, each score may be a discrete value (e.g., 0.2, 0.5, 0.8, etc.). The NER component 362 may use a model, such as a conditional random field (CRF) classifier, to determine the slot(s) associated with each textual interpretation.

Note that while the NER component 362 identifies words or phrases of a textual representation that may be important with respect to downstream processing (sometimes called light slot filling), and may even label those words or phrases according to type (e.g., artist name, album name, city, or the like), the NER component 362 may not perform entity resolution (i.e., determining the actual entity corresponding to the words or phrases). Entity resolution is typically a higher latency process and involves communications with a knowledge base or other component to precisely identify the specific entities. As this process is resource intensive, it may be preferable to not perform entity resolution for each item of slot of each textual interpretation output by each domain as some items have low scores and are unlikely to be used and any resources spent performing entity resolution would be wasted on low scoring items. Thus, a filtering of potential results may first be performed before engaging in more resource intensive processing.

Each domain may further include a domain classifier component 366 that generates domain score data 308 including a confidence score representing a probability that a textual interpretation represented in the text data 302 corresponds to the domain. The domain classifier component 366 may be a one-vs-all (OVA) classification component. That is, the domain score data 308 output from the domain classifier component 366 may represent a probability corresponding to a likelihood that the textual interpretation is associated with the domain rather than other domains of the NLU component 260. For example, a music domain recognizer will output first domain score data 308 that a particular textual interpretation relates to the music domain, the video domain recognizer will output second domain score data 308 that the same textual interpretation relates to the video domain, and so forth.

The domain classifier component 366 takes as input the text data 302. The domain classifier component 366 may optionally take as input the intent score data 304 and/or the slot score data 306. The intent score data 304 input into the domain classifier component 366 may include an N-best list of scores indicating likelihoods that respective intents of the domain may be associated with one or more textual interpretations represented in the text data 302. The slot score data 306 input into the domain classifier component 366 may include an N-best list of scores indicating likelihoods that slots of the domain may be associated with one or more textual interpretations represented in the text data 302. The confidence score may be a binned designator (e.g., low, medium, high, or any other binned designator). Alternatively, the confidence score may be a discrete value (e.g., 0.2, 0.5, 0.8, etc.). The domain classifier component 366 may use a plurality of maximum entropy classifiers. The number of maximum entropy classifiers used by the domain classifier component 366 may correspond to the number of domains implemented by the NLU component. In order to train the domain classifier component 366, the training utterances specific to the domain implementing the domain classifier component 366 may be retained and the training utterances associated with all other domains may be relabeled, for example with an "Out of Domain" label. This enables the domain classifier component 366 to operate with respect to a specific domain while being trained on as many data samples as a multi-domain classifier component.

The processes performed by the IC component 364 of a domain, the processes performed by an NER component 362 of a domain, and the processes performed by the domain classifier 366 of a domain may be performed substantially in parallel such that the processes of one component are not contingent upon the processes of another component.

Each potential NLU interpretation (NLU hypothesis) of a textual interpretation may include NLU result data for the respective NLU interpretation. The NLU result data may include intent score data 304, slot score data 306 and domain score data 308 for the respective NLU interpretation.

Each domain may additionally include one or more reranker components 368. The reranker component 368 may take as input a three dimensional vector including a first dimension corresponding to the intent score data 304 for the domain, a second dimension corresponding to the slot score data 306 for the domain, and a third dimension corresponding to the domain score data 308 for the domain. The reranker component 368 may use a model, such as a log-linear model having a cost function similar to a cross-domain ranker, to generate a confidence score for each textual interpretation. That is, the reranker component 368 of a domain, although operating specific to the domain, may be trained using training data (e.g., examples of textual interpretations and corresponding intents/domains/slots or other known NLU results) associated with multiple domains.

The reranker 368 may input the NLU results for a particular hypothesis and may output a new single score corresponding to the particular NLU hypothesis. Thus, the reranker 368 may generate a confidence score for a textual interpretation based on the intent score 304 associated with the hypothesis output by the IC component 364, the slot score 306 associated with the hypothesis output by the NER component 362, and the domain score 308 associated with the hypothesis output by the domain classifier component 366. Thus, the overall score generated for a hypothesis output by the reranker component 368 represents a likelihood that the hypothesis relates to the domain based on one or more intents derived from the textual interpretation, one or more slots determined for the textual interpretation, as well as other factors. The reranker component 368 may rank the textual interpretations based on the scores generated by the reranker component 368 for each textual interpretation, and therefrom create an N-best list of NLU results where the N-best list corresponds to the particular domain and the input text data 302. The reranker component 368 may output the N-best list of NLU results for further processing by other components of the NLU component 260. Each item of the N-best list may include a respective calibrated score. Alternatively, the reranker component 368 may output data 310 representing the highest scoring result for the particular domain.

The reranker component 368 may take as input other context information as well, and use such context information to determine the recognizer output data 310. The context information may indicate a mode of operation of the device 110 from which the audio data corresponding to the spoken utterance was received. The context information may indicate the type of device 110 from which the audio data corresponding to the spoken utterance was received. For example, if the context information indicates the device 110 is a smart television, a reranker component 368 associated with a video domain may increase a score generated based solely on the three dimensional vector input into the reranker component 368 whereas a reranker component 368 associated with a weather domain may decrease a score generated based solely on the three dimensional vector input into the reranker component 368. For further example, if the context information indicates the device 110 is a headless (i.e., displayless) device, a reranker component 368 associated with a music domain may increase a score generated based solely on the three dimensional vector input into the reranker component 368 whereas a reranker component 368 associated with a video domain may decrease a score generated based solely on the three dimensional vector input into the reranker component 368. The context information may further include ASR output data, such as an N-best list of ASR results with each item in the N-best list being associated with a respective score. The context information may also include user presence data, such as that output by the user recognition component 295. Other context information may also be useable.

The context information may further include scores output by a ranker and/or reranker of another recognizer of another domain. For example, if a reranker of one recognizer outputs a low score, the reranker of another recognizer may increase a score of its output based on the low score of the other reranker.

The reranker component 368 may operate on portions of data input therein and pass through or not operate on other portions of data input therein. For example, the reranker component 368 may operate on only a portion of the intent labels represented in the intent score data 304 input into the reranker component 368.

The reranker component 368 may also perform score calibration. Such calibration may normalize scores for purposes of cross-domain ranking. Such calibration may also be performed for downstream processing. For example, the calibration may indicate how confident the system is in the NLU results for the specific domain.

Figure 14:
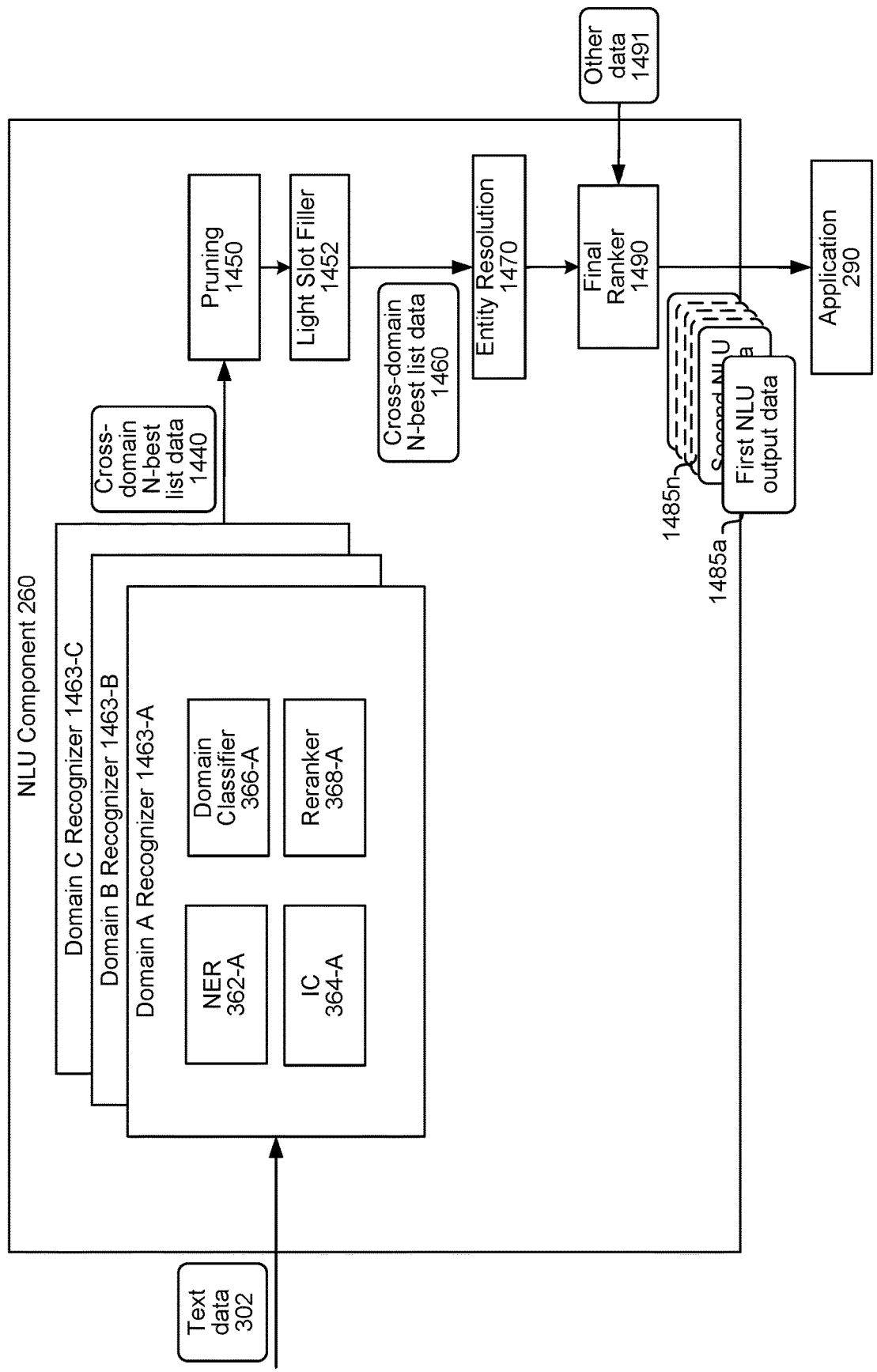
FIG. 14 is a conceptual diagram of portions of an NLU component architecture according to embodiments of the present disclosure.

The recognizer output data 310 corresponding to a single textual interpretation, or to an N-best list of data corresponding to multiple textual interpretations, output from each recognizer (and more specifically output from the reranker component 368 of each recognizer) may be compiled into a cross-domain N-best list represented in cross-domain N-best list data 1440 (as illustrated in FIG. 14). The N-best list represented in the cross-domain N-best list data 1440 may represent one or more textual interpretations represented in the text data 302 since each domain receives the same textual interpretations as input and may output the same or different textual interpretation as being the most likely textual interpretation that corresponds to the respective domain.

Figure 5:
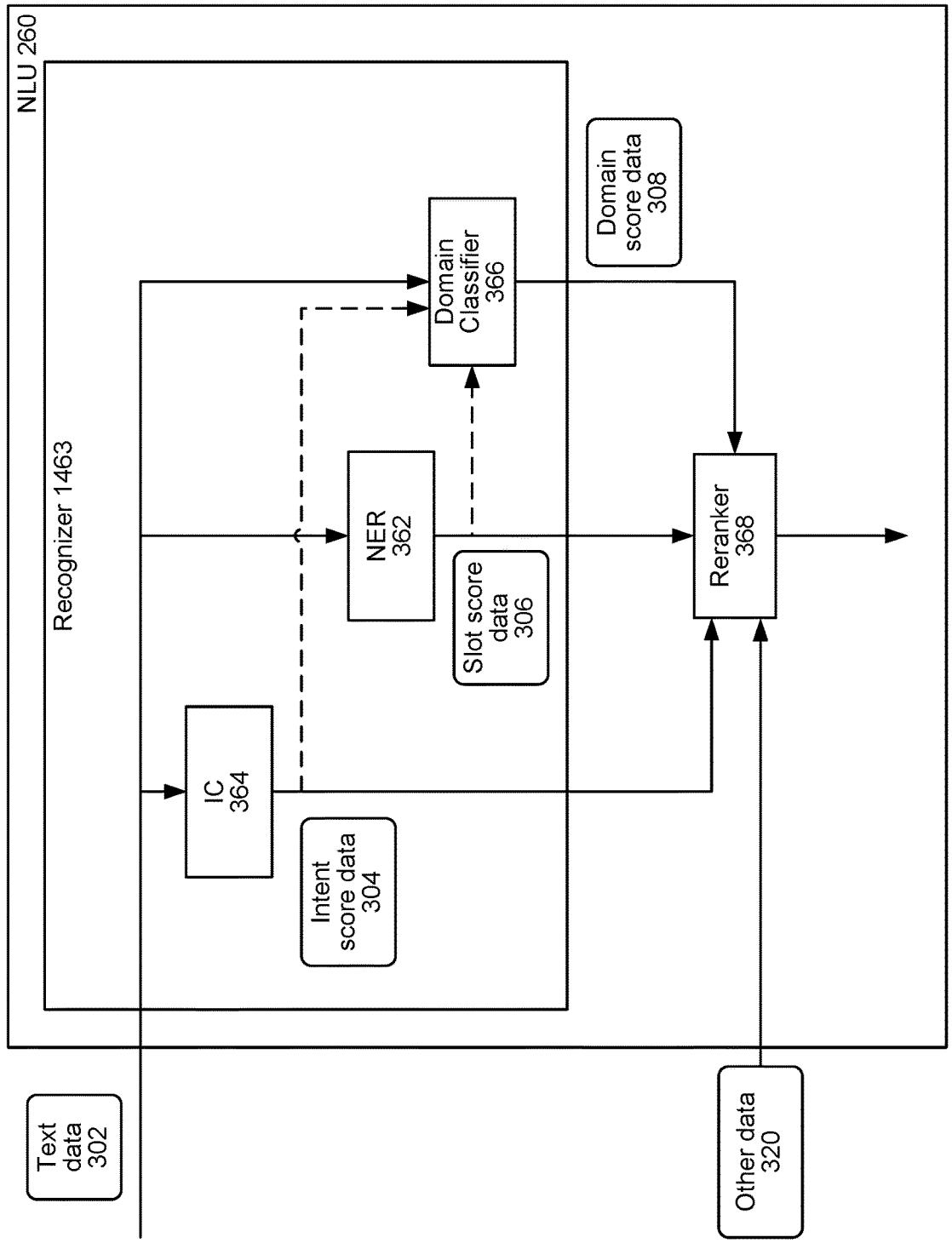
FIG. 5 is a conceptual diagram of components of an NLU component implemented with respect to a domain according to embodiments of the present disclosure.

While the reranker may be domain-specific, and thus may be incorporated within a domain specific recognizer 1463, a reranker may also be trained and operated such that it is not specific for a domain and may operate on NLU output data from multiple domains. An example of such an implementation is shown in FIG. 5, where the ranker 368 may be included within an NLU component 260 but may not be included in a domain specific recognizer 1463. In such a configuration the reranker 368 may operate on NLU output data from multiple domains and may create new scores for different NLU hypotheses from multiple domains and may use the new scores to rank the hypotheses against each other.

Returning to the configuration of FIG. 3, the output of a domain (namely the output of the reranker component 368 of the domain) may represent intents and slots corresponding to the domain's top hypothesis choices as to the meaning of one or more textual interpretations represented in the text data 302, along with new scores for each hypothesis as determined by the reranker 368. For example, for text data 302 corresponding to a single textual interpretation corresponding to "play poker face by lady gaga," a music domain reranker 368 may output NLU data (e.g., recognizer output data 310) in the form of an N-best list of hypotheses such as:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface

As shown, each hypothesis includes an intent (as determined by the IC 364), one or more text strings/slots (as determined by the NER 362) corresponding to potential entities that can be used for the intent, and an overall score for the hypothesis, as determined by the reranker 368. Thus, the IC component 364 of the domain has determined that the intent of the textual interpretation represented in the text data 302 is a PlayMusic Intent (and selected that as the intent for each item on the music domain N-best list). The NER component 362 of the domain has determined that, for different items in the N-best list, the words "poker face" correspond to a slot and the words "lady gaga" correspond to a slot. Finally, the reranker 368 has determined a respective overall score for each hypothesis, where that overall score is determined using the intent score data 304, slot score data 306, domain score data 308 and/or other data 320.

An example configuration of a reranker 368 is shown in FIG. 4. As shown in FIG. 4, intent score data 304, slot score data 306, domain score data 308 and other data 320 corresponding to each hypothesis may be stored in a feature vector 402. Each hypothesis determined by the recognizer may have its own feature vector. Each feature vector may then be multiplied by a (transposed) weight vector 404 to obtain a dot product (416). The resulting values may be summed (417) to determine the overall score for each hypothesis. The individual hypotheses may then be ranked according to their scores 419 into an N-best list by the N-best list generator 421, which may then output the ranked N-best list (which as noted above may include intent data, slot/NER data, and the overall score) as recognizer output data 310.

Thus, to determine the overall score for a particular hypothesis, a reranker 368 may add the scores output by each IC model 364, NER model 362 and DC model 366, after those individual scores are weighted as shown in Equation 1:

$$\text{score} = w_1(D_i|X_i) + w_2(S_i|X_i) + w_3(I_i|X_i) \quad (1)$$

In Equation 1, $w_1(D_i|X)$ corresponds to the probability score $D_i$ 308 output by the DC model 366 for the particular hypothesis $X_i$ multiplied by weight $w_1$, $w_2(S_i|X_i)$ corresponds to the confidence score $S_i$ 306 produced by the NER model 362 multiplied by weight $w_2$, and $w_3(I_i|X_i)$ is the confidence score $I_i$ 304 produced by the Intent Classifier model 364 multiplied by weight $w_3$. The score may be calculated for each domain $D_i$. The individual weights $w_1$, $w_2$, and $w_3$ are the weights for the particular reranker 368 as determined in the training process discussed below. The overall score may be normalized to be in a particular range (e.g., 0-1) and/or the weights may be trained such that the score of Equation 1 is within the desired particular range (e.g., 0-1). Alternatively the scores and weights may be in a different numeric range.

The reranker 368 may include a log-linear model trained to assign the overall scores to individual NLU hypotheses based on the NLU result data (e.g., intent score data 304, slot score data 306, domain score data 308) input into the reranker. The reranker may be trained by jointly optimizing semantic error rate (SEMER) and interpretation error (IRER) based cross entropy to improve the overall accuracy and reliability of NLU outputs.

The reranker 368 includes a trained a log-linear model that combines various features available in the speech processing pipeline to minimize the semantic error. The optimized weights are used to score NLU hypotheses so as to improve a given automatic accuracy metric. Semantic Error Rate (SEMER) may be used as an accuracy metric for the NLU system. SEMER measures the performance of the model in detecting the intents and slots in user requests. There are generally three types of errors in a hypothesis with respect to reference interpretation: substitution errors (S), insertion errors (I) and deletion errors (D). The formula for SEMER computation is shown in Equation 2 below, where S+I+D is the total number of errors in the top NLU hypotheses, and N is the total number of intents and slots in the reference annotations:

$$SEMER = \frac{S+I+D}{N} \quad (2)$$

Consider a set of I input utterances (user requests): $\{X_1, \ldots, X_I\}$. For each utterance, there are up to k hypotheses (interpretations) produced by the NLU model. Let $h_{ik}$ be the $k^{th}$ hypothesis for utterance $X_i$. Let $s_{ik}$ denote the NLU interpretation score (e.g., the score to be determined by reranker 368) associated with hypothesis $h_{ik}$. The scores for each hypotheses may be determined by the linear model represented below by Equation 3:

$$s_{ik} = \Sigma_j w_j f_{ikj} \quad (3)$$

where $f_{ikj}$ is a vector representing the input features (e.g., intent score data 304, slot score data 306, domain score data 308, or other data 320) for the particular hypothesis $h_{ik}$ and $w_j$ is vector including the weights assigned to those particular features as trained in the log-linear model. For each utterance $X_i$, the reranker 368 may rank each of the $h_{ik}$ hypotheses in a descending order of the corresponding model score $s_{ik}$. The weights w are the model parameters that are optimized on a development set based on an objective function that measures the goodness of the selected hypothesis.

For efficient optimization in a potentially larger feature space, the objective function may be continuous and differentiable with respect to the weights, which in turn allows us to use gradient-based optimization algorithms, such as L-BFGS (a limited memory Broyden-Fletcher-Goldfarb-Shanno (BFGS) algorithm). Thus, a differentiable objective function called expected-SEMER (eSEMER) may be constructed, as denoted in Equation 4 below:

$$eSEMER = \frac{\sum_i \sum_k p_{ik} e_{ik}}{N} \quad (4)$$

where $e_{ik}$ denotes the number of errors in hypothesis $h_{ik}$, according to SEMER scoring against the reference annotations. The variable $p_{ik}$ is the posterior probability of candidate hypotheses normalized through a soft-max function. The posterior probabilities $p_{ik}$ are defined in Equation 5:

$$p_{ik} = \frac{\exp(\gamma s_{ik})}{\sum_j \exp(\gamma s_{ik})} \quad (5)$$

Here $\gamma$ is a hyper-parameter that controls the entropy of the posterior probabilities $p_{ik}$ of the candidate hypotheses. The larger the $\gamma$, the lower the entropy. As the entropy approaches 0, the expected SEMER becomes equivalent to 1-best SEMER scoring. Large values of $\gamma$ may lead to slower convergence when using batch L-BFGS. This may be less of a problem with stochastic gradient L-BFGS, the system may start with a lower $\gamma$ and run multiple outer iterations of batch L-BFGS with progressively larger $\gamma$.

The system may also apply length normalization to the weights during the optimization/training process so as to keep the entropy of the posteriors stable. This is important because the expected SEMER score can be trivially reduced by scaling up the weights $w_j$ (which is effectively the same as using a larger $\gamma$). To enforce length normalization, $s_{ik}$ may be redefined as:

$$s_{ik} = \Sigma_j \hat{w}_j f_{ikj} \quad (6)$$

where $$\hat{w}_j = \frac{w_j}{\sqrt{\sum_{i=1}^n w_i^2}} \quad (7)$$

Figure 6:
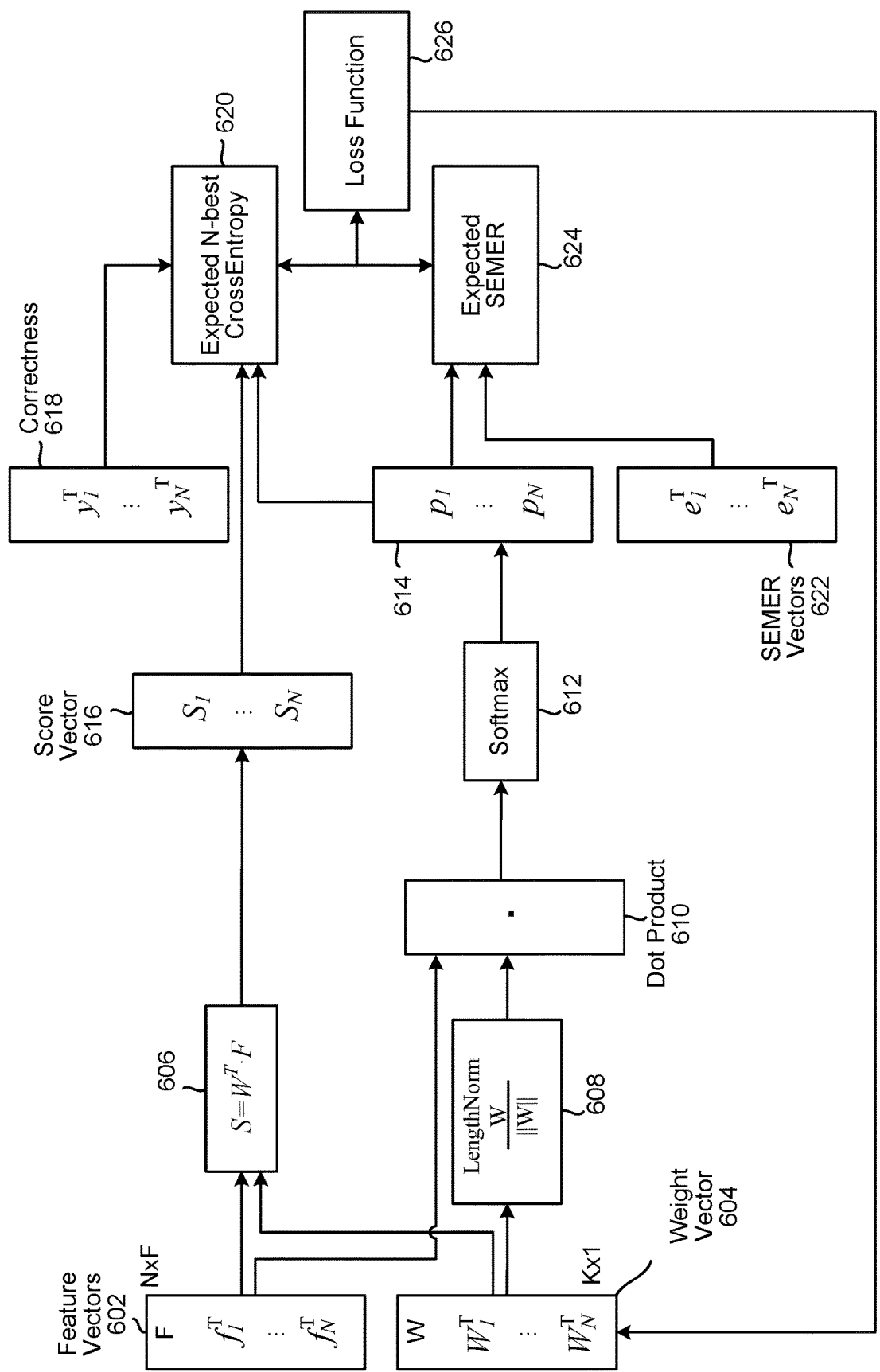
FIG. 6 is a diagram illustrating training of a weight vector for use with a reranker according to embodiments of the present disclosure.

Training for the log-linear model for a reranker 368 may be done as illustrated in FIG. 6. To train the reranker 368, a number of training utterances may be used where each training utterance includes a number of NLU hypotheses, with each NLU hypothesis having NLU output scores (e.g., intent score data 304, slot score data 306, domain score data 308) for the hypothesis as well as ground truth data indicating whether the hypothesis is correct or incorrect, as well as potentially how many errors are in each hypothesis. As shown in FIG. 6, input feature vectors 602 may correspond to feature vectors f, where each feature vector f includes the NLU output scores (intent score data 304, slot score data 306, and domain score data 308) for each of k hypotheses. There are N feature vectors f where N corresponds to the number of utterances. The feature vectors 602 may be transposed for training. The feature vectors 602 may have a dimensionality of N×F.

Weight vector 604 include the weights to be applied to each particular score in the corresponding feature vector. Each weight w corresponds to a particular score of the feature vector. Thus there is a particular weight for each feature of a feature vector f. While each weight may be initialized to some value at the outset of training (perhaps to a same value), the training process (e.g., the functions of training carried out by, for example, the expected N-best cross entropy function 620, the expected SEMER function 624 and the loss function 626) may change the weights to optimize the expected output. The final weights from the training process will be the log linear model stored and incorporated in to the reranker 368 to be operated at runtime to determine the new NLU output scores, such as those discussed above in reference to FIG. 3B and Equation 3. The weights may be transposed in the weight vector 604. The weight vector 604 may have a dimensionality of K×1.

The score S for each hypothesis may be calculated by the scoring function 606 where each score is equal to the dot product of $W^T$ and F. Although noted as the dot product of $W^T$ (e.g., the weight vector transposed), depending on the structure and dimensionality of the weight vector 604 and feature vector 602, no transpose may be necessary. The result of each dot product operation is a scalar value, thus resulting in a scalar value for each hypothesis 1 through N. The scalar values for each hypothesis is then included in a the score vector 616 with a score for each utterance N. Each weight may have a value of 0-1, each feature value may have a score from 0-1 thus each resulting score may have a value from 0-1. The correctness vector 618 includes a correctness value y for each hypothesis of each utterance.

The weight values may then be normalized using normalization function 608 and multiplied by the dot product 610 of the normalized weights by the feature vector values. The output of that may be input to a softmax operation 612 which feeds the posterior probability vector 614. The SEMER vectors 622 represent the semantic errors for each hypothesis. The error values e are part of the ground truth information, where e=an integer value corresponding to the number of errors in a particular hypothesis. If the hypothesis has one error, e=1, if the hypothesis has two errors, e=2, and so forth. The posterior values 614 and SEMER values 622 are fed into an expected SEMER (eSEMER) operation 624 which may calculate an expected SEMER value, for example using Equation 4, which will then be fed into the loss function 628. The loss function 628 also takes as input the output from an expected cross entropy function 620 (discussed below). The loss function 628 then retrains the weights 604 until weights are obtained that result in the desired system operation. The resulting weights are then stored for use during runtime by the reranker 368 in calculating combined hypothesis scores, for example using Equation 3.

One goal of the training is to create weights that will result in each hypothesis being assigned a score that reflects the confidence of the system that the hypothesis is correct. The resulting hypothesis posterior can also be interpreted as the probability of the hypothesis being correct. The advantage of a calibrated system is that new scores can be compared with a rejection threshold, such that the hypotheses with scores lower than the rejection threshold are considered unreliable and rejected by the system. This can help prevent the downstream system from acting on potentially incorrect hypotheses which may have high associated costs, e.g., inadvertently ordering something, or turning off the lights.

In training the various rerankers 368 that may be used in multiple different domains, the system may train them such that their scores are calibrated with respect to each other. Thus a score assigned to one hypothesis by a reranker in one domain may be compared against a score assigned to a different hypothesis by a reranker in another domain and the higher of the scores may indicate that the system is more confident of that particular hypothesis since the rerankers are outputting scores using the same scale. The calibration may be done during using the expected cross entropy function 620.

A training set used to train the various rerankers may be the same, but the ground truth information may change from reranker to reranker. For example, for a training utterance that invokes the music domain, the ground truth information may indicate that the utterance belongs in the music domain. Thus, the label will be either 1 (for the music domain) or 0 for any other domain. Thus the scores for that utterance belonging to the music domain are pushed higher in training while the scores for that utterance belonging to another domain (for example, weather) may be pushed down. As the ground truth labels for the utterance are the same across different domain rerankers (e.g., 1 or 0), the resulting scores at runtime for the rerankers may be calibrated. If, however, each domain's reranker were trained separately, each on its own domain-specific training set, the reranker would learn how to rank utterances within its own domain, but would be trained only on in-domain labels and would not necessarily be trained on how to handle utterances that are properly within a different domain. For example, instead of being trained on 1 or 0 (in-domain or out of domain), the label would be which intent within the domain the training utterance belongs to since all the training utterances are, by configuration, within the domain Thus, using a common training corpus for the rerankers and the cross-entropy function allows the ultimate scores for the rerankers to be compared against each other across domains. Cross-entropy is the measure of nonsymmetrical difference between the true model and the inferred model. The system may use the cross-entropy loss as the loss function for calibration. The cross-entropy loss value $(CE_{ik})$ for hypothesis $h_{ik}$ is given below:

$$CE_{ik} = -y_{ik}\log(s_{ik}) - (1-y_{ik})\log(1-s_{ik}) \qquad (8)$$

where $s_{ik}$ is the hypothesis score and $y_{ik}$ is the binary correctness judgment of a hypothesis (0 for incorrect and 1 for correct) with respect to the reference interpretation.

A binary accuracy metric we use in NLU is Intent Recognition Error Rate (IRER) may be used as an NLU accuracy metric. IRER may be defined as:

$$IRER = = \frac{\sum_{i=1}^{N} e_i}{N} \quad (9)$$

where $e_i$ is the binary error of the top hypothesis for utterance $X_i$ and N is the total number of input utterances. A hypothesis is correct if there are zero errors in this hypothesis, i.e., S+I+D=0. An incorrect hypothesis is where S+I+D>0. $y_{ik}$ in Equation 8 can be defined as:

$$y_{ik} = 1 - e_{ik} \quad (10)$$

where $e_{ik}$ is the binary error of the $k^{th}$ hypothesis for utterance $X_i$. Thus the correctness values 618 may either be 0 (indicating that the training hypothesis is correct) or 1 (indicting that the training hypothesis is incorrect) (or vice versa depending on system configuration). The correctness values may be ground truth data known a priori for each hypothesis.

The expected cross entropy (eCE) 620 may be used as the objective function. For a given utterance i that has k hypotheses, the cross-entropy for utterance i is the sum of cross-entropy of k hypotheses weighted by $p_{ik}$. Thus, the overall expected cross-entropy may be expressed as:

$$eCE = \Sigma_i \Sigma_k p_{ik} CE_{ik} \quad (11)$$

where $p_{ik}$ is defined as above in Equation 5.

SEMER and expected cross entropy may be jointly optimized. The advantage of this approach is that the resulting confidence scores are consistent with the ranking of the hypothesis in the n-best. The joint loss function 626 is expressed below:

$$L = \beta_0 eSEMER_{ik} + \beta_1 eCE_{ik} + \beta_2 R \quad (12)$$

Where R is a regularization term (e.g., L2 penalty on model parameters) in the loss function, and $\beta_0$, $\beta_1$, and $\beta_2$ are weights for each component in the loss function. In certain system configuration an equal weighting of eSEMER and eCE may be desired, such that $\beta_0 = \beta_1$.

Through training and optimization of the desired training functions, the system may arrive at values for the weights 604 that a reranker 368 may use at runtime. Different rerankers 368 may have different weights, as the weights for a reranker in one domain may be different for the weights for a reranker in another domain.

The ultimate trained weights are specific for the features that they will ultimately be used with. Thus there may be one weight for an IC score 304, another weight for an NER score 306, and so forth. As shown in FIG. 3, other data 320 may also be considered by the reranker 368. The system may account for the other data 320 during training by assigning values for the other data 320 to each training utterance, and incorporating those values in the feature vectors 602. Thus, space may be allocated in the feature vector for other data 320 that the reranker 368 will be configured to use at runtime. As part of the training process, weights will be determined for such other data 320, thus allowing the reranker 368 to properly weight the other data during runtime when determining the overall score to assign to a particular hypothesis. The particular reranker may thus include a log linear model with weights corresponding to the trained values of the weight vector 604 with assigned weights for each potential spot in the feature vector.

Thus, the score for a particular hypothesis may be determined at runtime by the reranker 368 as:

$$\text{score} = w_1(D_i|X_i) + w_2(S_i|X_i) + w_3(I_i|X_i) + w_4(O_{1i}|X_i) + \ldots \\ w_z(O_{zi}|X_i) \quad (13)$$

where each item of other data $O_1$ through $O_z$ for each utterance i is weighted by the respective weight $w_4$ through $w_z$, the values of which are determined during training. The weights for each individual reranker may vary depending on the ranker domain, various other data in consideration, etc.

Figure 7:
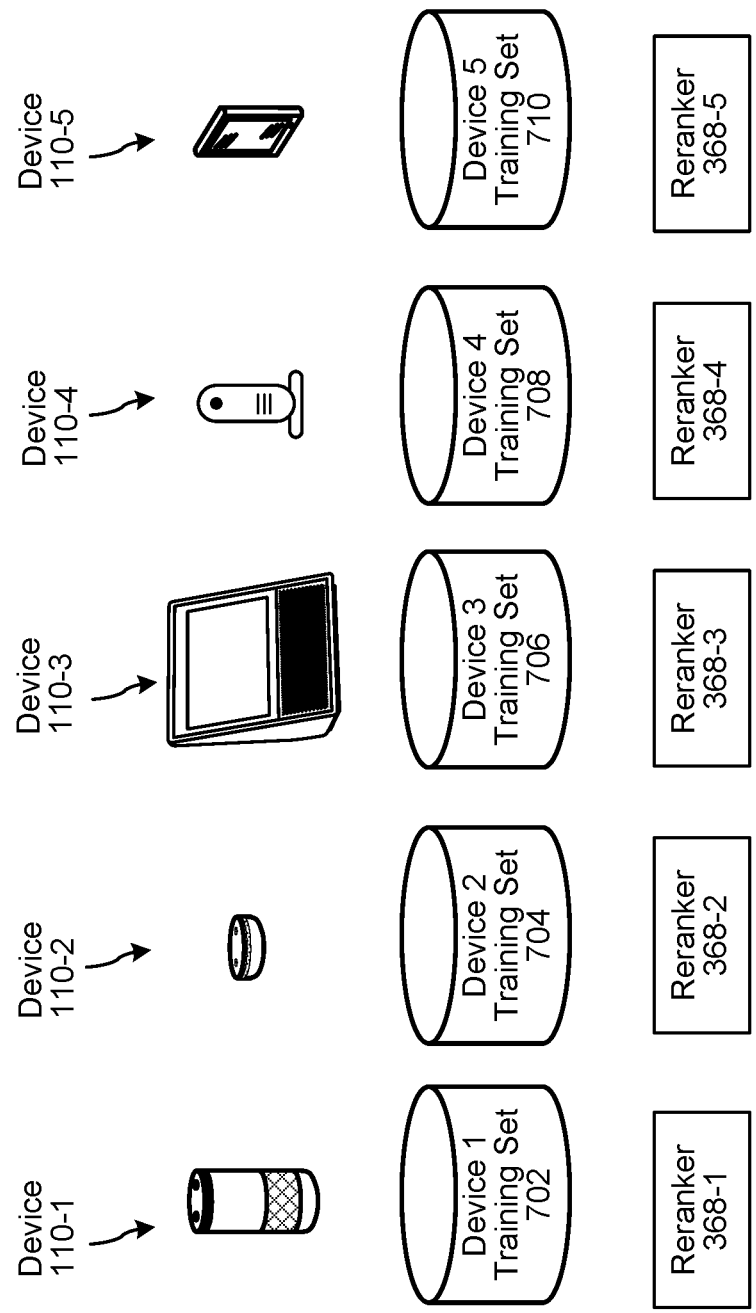
FIG. 7 illustrates device-specific training sets according to embodiments of the present disclosure.

As noted above, the system may desire different NLU operation for the same input utterance depending on the type of device that the utterance was spoken to. To configure this different operation, the system may determine different sets of training utterances, where each particular training set is comprised of utterances spoken to a particular type of device. For example, FIG. 7 shows five example devices. The first device 110-1 may be a smart speaker such as an Amazon Echo that has a microphone array and output speaker. The second device 110-2 may be a smart speaker such as an Amazon Echo dot that has a microphone array and smaller built-in speaker, but the ability to connect an external speaker via a physical jack. The third device 110-3 may be a video device such as an Amazon Echo Show that has a microphone array, camera, video display and output speaker. The fourth device 110-4 may be a camera device such as an Amazon Echo Look with a microphone, camera, and output speaker. The fifth device 110-5 may be a mobile device such as a smartphone with a microphone, display, camera, speaker, and other components.

As shown, the system may configure different training sets for each device where their respective training sets include utterances for each device. Thus, device 1 training set 702 may include utterances spoken to devices of the type of device 110-1, device 2 training set 704 may include utterances spoken to devices of the type of device 110-2, and so forth. The respective training sets may be used to train individual rerankers 368 (for example using the training operations discussed above) such that reranker 368-1 is trained using training utterances from training set 702, reranker 368-2 is trained using training utterances from training set 704 and so forth. Thus, a reranker 368-1 for use with utterances for device 1 may have slightly different weights than a reranker 368-4 for use with utterances for device 4. Other devices beyond the five illustrated may also have their own training sets and respective rerankers.

At runtime, the system may determine that an incoming utterance was captured by a particular device type. That determination may be made by referencing metadata received from the device, which may include a device ID, device model type, or other information that may be used by the system (such as by context manager 275) to identify the source device. The system may then route the NLU data for the utterance to the appropriate device-specific reranker.

As noted above, the system may employ multiple domain-specific rerankers, where each reranker is configured to process NLU data for a hypothesis as if the hypothesis belongs to the domain in question. For example, as shown in FIG. 3, a reranker 368 may be located within a recognizer 1463 and may assign new scores to each hypothesis (and rank hypotheses using those scores) as if the hypothesis was in the domain in question. If, however, the system employs device-specific rerankers as well as domain specific rerankers, each recognizer 1463 may include one trained reranker 368 for each supported device type. This will result in D×T total rerankers, where D is the number of domains supported by the system and T is the number of device types supported by the system. Thus, for example, if the system supports five device types, each domain specific recognizer 1463 will have five rerankers 368. If ten domains are supported, this will result in fifty total rerankers across the system. In such a scenario, the rerankers for different domains but for the same device type may be trained using a same training set to ensure calibration as discussed above. Thus, for device type 1, the rerankers 368-A-1, 368-B-1, etc. for each specific domain A, B, etc. may be trained on the same training set 702. For device type 2, the rerankers 368-A-2, 368-B-2, etc. for each specific domain A, B, etc. may be trained on the same training set 704, and so on for the remaining device types.

Figure 8:
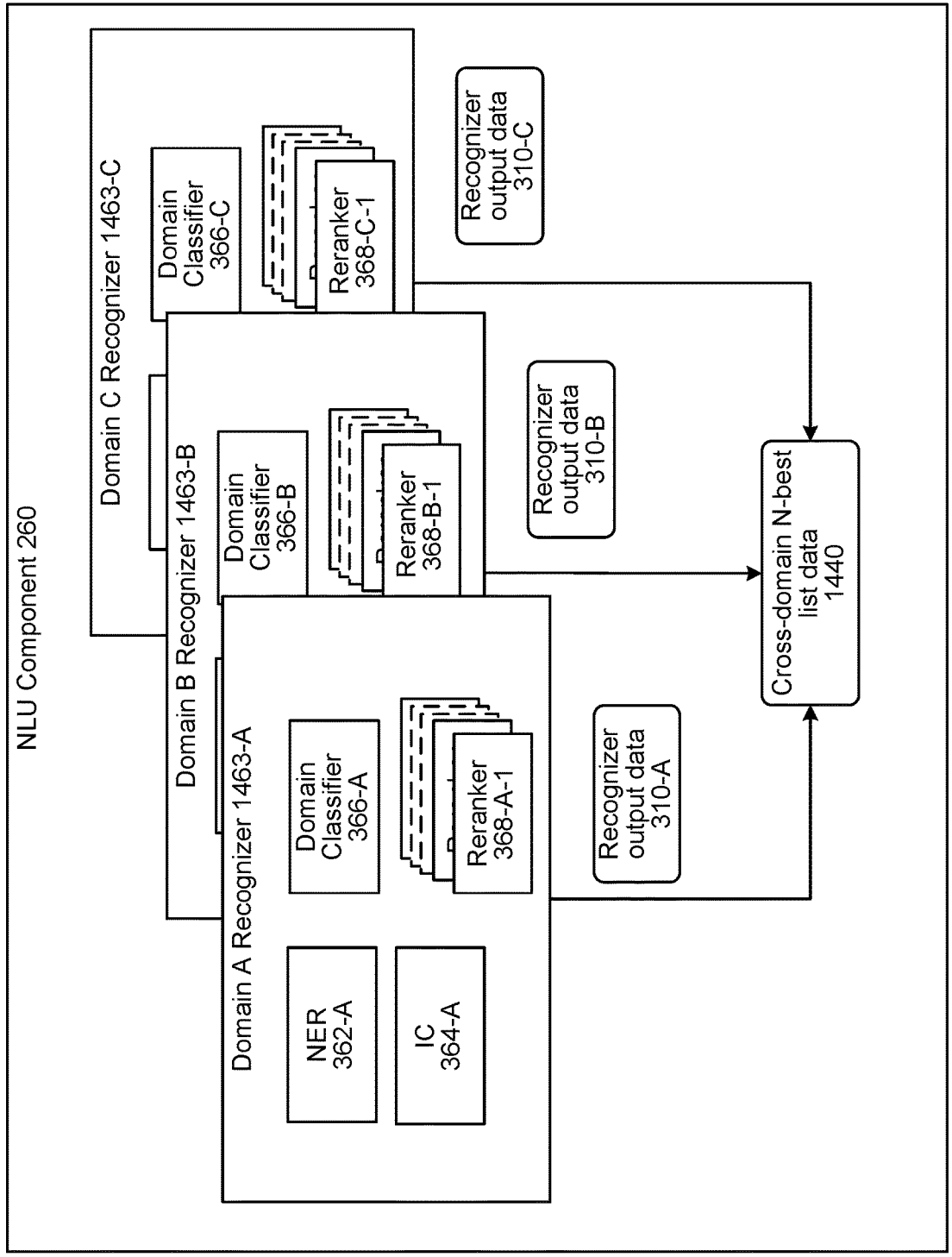
FIG. 8 is a conceptual diagram of portions of an NLU component architecture according to embodiments of the present disclosure.

Portions of an NLU pipeline showing domain and device specific rerankers are shown in FIG. 8. Three example domain recognizers are shown in FIG. 8. As illustrated, each recognizer includes a plurality of rerankers, where each reranker is configured to process NLU data related to utterances from a particular device for the specific domain. Each specific reranker 368 may output data 310 comprising a reranked N-best list of hypotheses for the specific reranker with NLU results data such as intents, slots, and new scores determined by the reranker. An example for a reranker in the music domain is discussed above. The recognizer output data 310 for a particular domain may only include one N-best list, as for a specific utterance only the reranker for the device corresponding to that utterance may be activated during runtime. Thus, each domain may output an N-best list of NLU hypotheses, illustrated in FIG. 8 as output data 310-A for domain A, 310-B for domain B, and 310-C for domain C. These collective N-best lists may be combined into cross-domain N-best list data 1440. The cross-domain N-best hypotheses may then be ranked against each other based on the scores from the different domains, which have been calibrated as a result of the reranker training. These cumulative cross domain N-best list data 1440 may be sent to one or more downstream components (such as those discussed below in reference to FIG. 14) for further processing and eventual execution.

Figure 9:
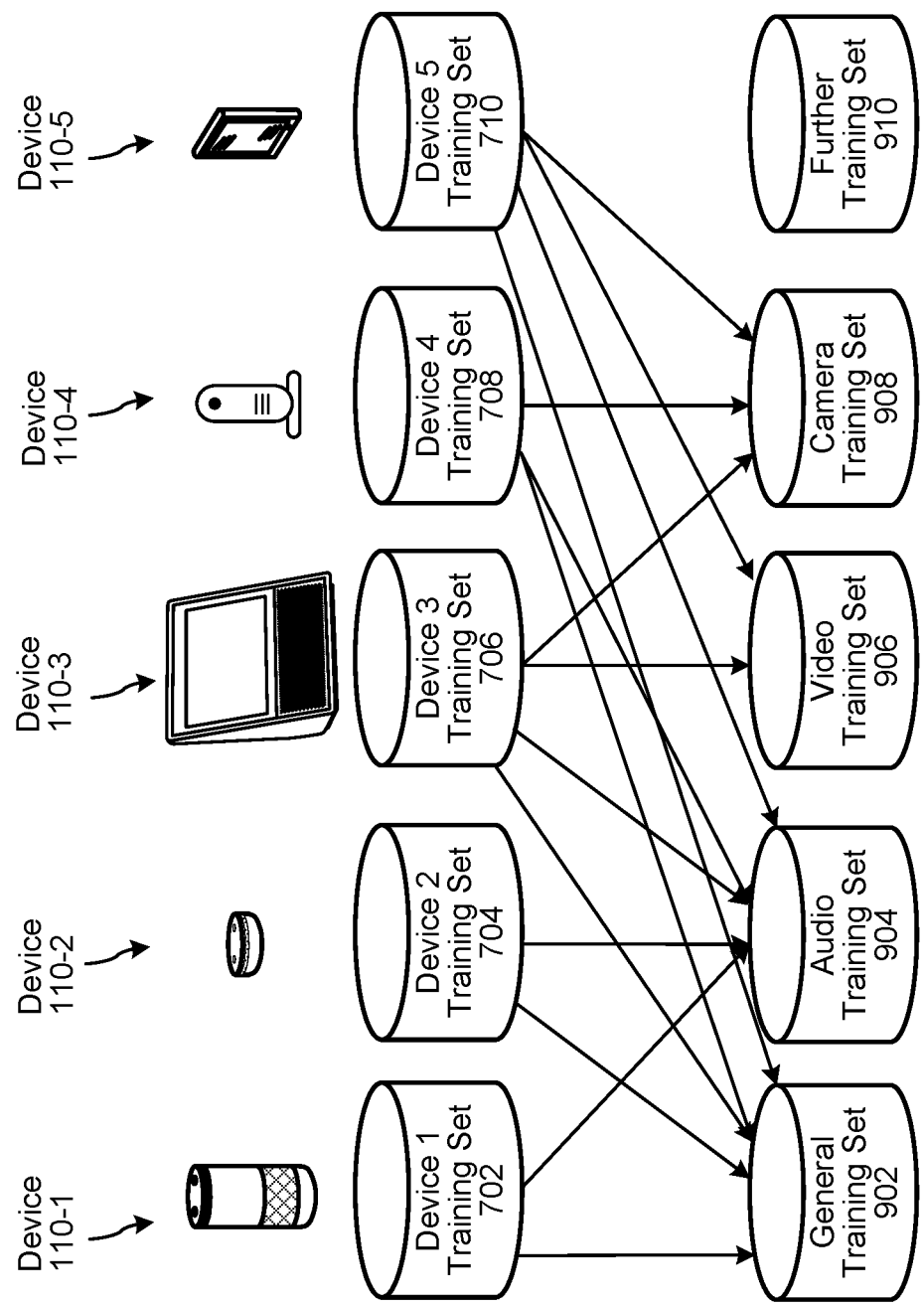
FIG. 9 illustrates device-capability based training sets according to embodiments of the present disclosure.

As can be appreciated, under this arrangement the system may need to configure a new reranker for each domain every time a new device is configured for the system. This may be undesirable as it may require the device manufacturer or other outside entity to provide training utterances that can be used to create a reranker appropriately biased for the operation of the device. One solution for this problem is to create different utterance training sets based on the hardware capabilities of a device, rather than on the specific device type/device model. For example, training sets based on device capability can be created by combining utterances spoken using devices that have the capability. For example, as shown in FIG. 9, different utterance training sets can be created based on the hardware capabilities of a device. As shown in FIG. 9, one training set 904 can include all the training data from devices capable of outputting audio. Another training set 906 can include all the training data from devices capable of outputting video. Another training set 908 can include all the training data from devices that have a camera. Further training set(s) 910 may also be created based on the different hardware/configurations of different devices. Then, if a new device is introduced to the system, the appropriate training set(s) corresponding to the hardware capabilities of the device may be used and/or combined with other training sets to train a reranker (for example using the training operations discussed above) that can be used for the new device. The reranker may be multi-domain or domain specific depending on the system configuration/training set.

It may, however, be undesirable for the system to operate many rerankers for different device, such as those shown for example in FIG. 8. First, it may be resource intensive to retrain a new reranker every time a new device type is created or added to the capability of the system, but such new rerankers may be desired to ensure the reranker for a new device type is biased appropriately for the operations with that particular device type. Further, certain devices may have varying hardware capabilities depending on operational context. For example, an Echo Dot device type 110-2 may be linked to a television so voice commands to the Echo Dot can control the television. Certain circumstances (such as those with an active video session) may call for biasing of commands received by the Echo Dot toward video applications while other circumstances (such as those without an active video session) may call for biasing toward audio applications.

It may thus be desirable to configure a reranker that can operate on utterances from multiple different devices, while at the same time considering context data such as device capability, ongoing operations of the device (such as ongoing video or audio sessions) or other data. The system can thus train a reranker (for example using the training operations discussed above) with an expanded training set and expanded feature vectors that allow for configuration of a unified multi-device reranker that can take in information about the device type/capabilities and other context information to activate appropriate weighting for the input feature values where the weighting is appropriate for the particular device context.

Thus, training sets from multiple devices may be combined into a single general training set, such as training set 902 illustrated in FIG. 9. The individual training utterances of the combined training set may be associated with feature values that indicate the device type/capabilities of the device corresponding to the particular training utterances. Further, the training utterances may also be associated with feature values that correspond to the context of the utterances. The context/device data may be incorporated into the feature vectors at training (e.g., into feature vectors 602) so that the resulting reranker may have weights (e.g., weights in weight vector 604) that can appropriately handle the context/device data at runtime, thus resulting in a multi-device reranker that can handle context data, effectively enabling the system to use the same trained reranker to, at runtime, appropriately bias utterances from different input devices.

A reranker that can be used for utterances from different devices may reduce duplicate instances of a reranker within the NLU engine and on NLU servers as well as reduce redundant NLU model training, testing and bug fixing. The ability of the reranker to incorporate context data may allow more easy expansion of the NLU system to incorporate new input devices as well as the NLU system to more appropriately handle utterances from device types where certain utterances should be processed differently depending on context (e.g., an Echo Dot potentially connected to a television).

Figure 10:
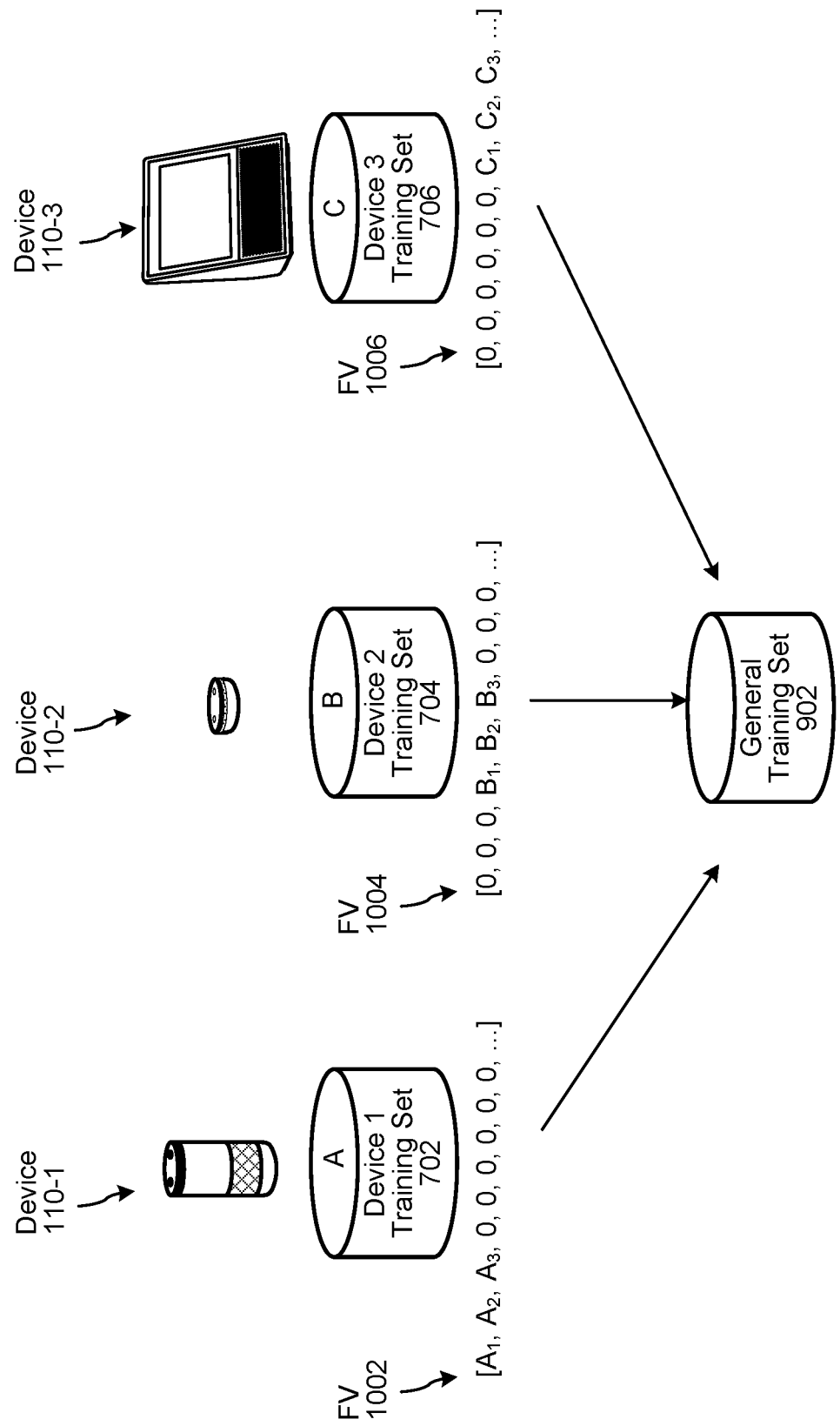
FIG. 10 illustrates creating of a multi-device training set according to embodiments of the present disclosure.

To train such a contextual reranker, the system may configure an utterance training set where each utterance is associated with a feature vector representing the feature values that describe the context of the utterance. An example of associating such a feature value with training utterances is shown in FIG. 10. As shown in FIG. 10, a general training set 902 may be populated with training data from different device-specific training sets. The examples shown in FIG. 10 are training set 1 702 representing utterances captured by device type 110-1 (e.g., an Amazon Echo), training set 2 704 representing utterances captured by device type 110-2 (e.g., an Amazon Echo Dot) and training set 706 representing utterances captured by device type 110-3 (e.g., an Amazon Echo Show). Although three device types are illustrated, different numbers and combinations of device types and corresponding training sets may be used.

Each utterance incorporated into the general training set 902 may be associated with a feature vector indicating the context of the utterance. One part of that context data may include the device type from which the utterance originated, though other types of context data may be considered, as discussed below. For each training utterance, a context profile may be selected where the context profile (further discussed below) represents the state of the context data as it applies to the particular training utterance. The context profile then determines what portion of the feature vector is populated by the respective NLU scores corresponding to the training utterance. For example, as shown in FIG. 10, each utterance may be associated with a feature vector (FV) of a certain length. The first nine values of the feature vectors may be allocated to NLU data associated with the utterance, with the first three values (e.g., a first subset of the feature vector) being allocated to NLU data (e.g., intent score data 304, slot score data 306, domain score data 308) for utterances having a first context profile, the second three values (e.g., a second subset of the feature vector) being allocated to NLU data for utterances having a second context profile and the third three values (e.g., a third subset of the feature vector) being allocated to NLU data for utterances having a third context profile.

Thus, training utterances that correspond to the first context profile may be associated with FVs in the form of 1002 where the first three values are non-zero (for example, value A1 being associated with the utterance's intent score data, value A2 being associated with the utterance's slot score data 306 and value A3 being associated with the utterance's domain score data 308) and the next six values are zero. Training utterances that correspond to the second context profile may be associated with FVs in the form of 1004 where the first three values are zero, the next three values are non-zero (for example, value B1 being associated with the utterance's intent score data, value B2 being associated with the utterance's slot score data 306 and value B3 being associated with the utterance's domain score data 308) and the next three values are zero. Training utterances that correspond to the third context profile may be associated with FVs in the form of 1006 where the first six values are zero and the next three values are non-zero (for example, value C1 being associated with the utterance's intent score data, value C2 being associated with the utterance's slot score data 306 and value C3 being associated with the utterance's domain score data 308). Each feature vector 1002, 1004, and 1006 may also contain values for different context profiles (represented by the " . . . ") where the number of subsets/positions in the FV is configurable by the system.

The training set may then be used to train a reranker as discussed above, with each individual utterance's expanded feature vectors being used, for example, as feature vectors 602. The training operation may then train weights for the weight vectors 604 that will weigh the feature vector data (either corresponding to NLU output data or to context data) accordingly, so that the resulting weights for the log linear model of the reranker may properly process NLU data given the runtime context. Thus, at runtime, the system will populate a feature vector for an incoming NLU hypothesis associated with an utterance, where the feature vector will have values in the appropriate slots corresponding to the context profile. The feature vector at runtime will be processed by the log linear model of the contextual reranker at runtime to determine the appropriate hypothesis score that uses the weights trained for that particular context profile to alter the NLU scores that are in the populated feature vector.

Figure 11:
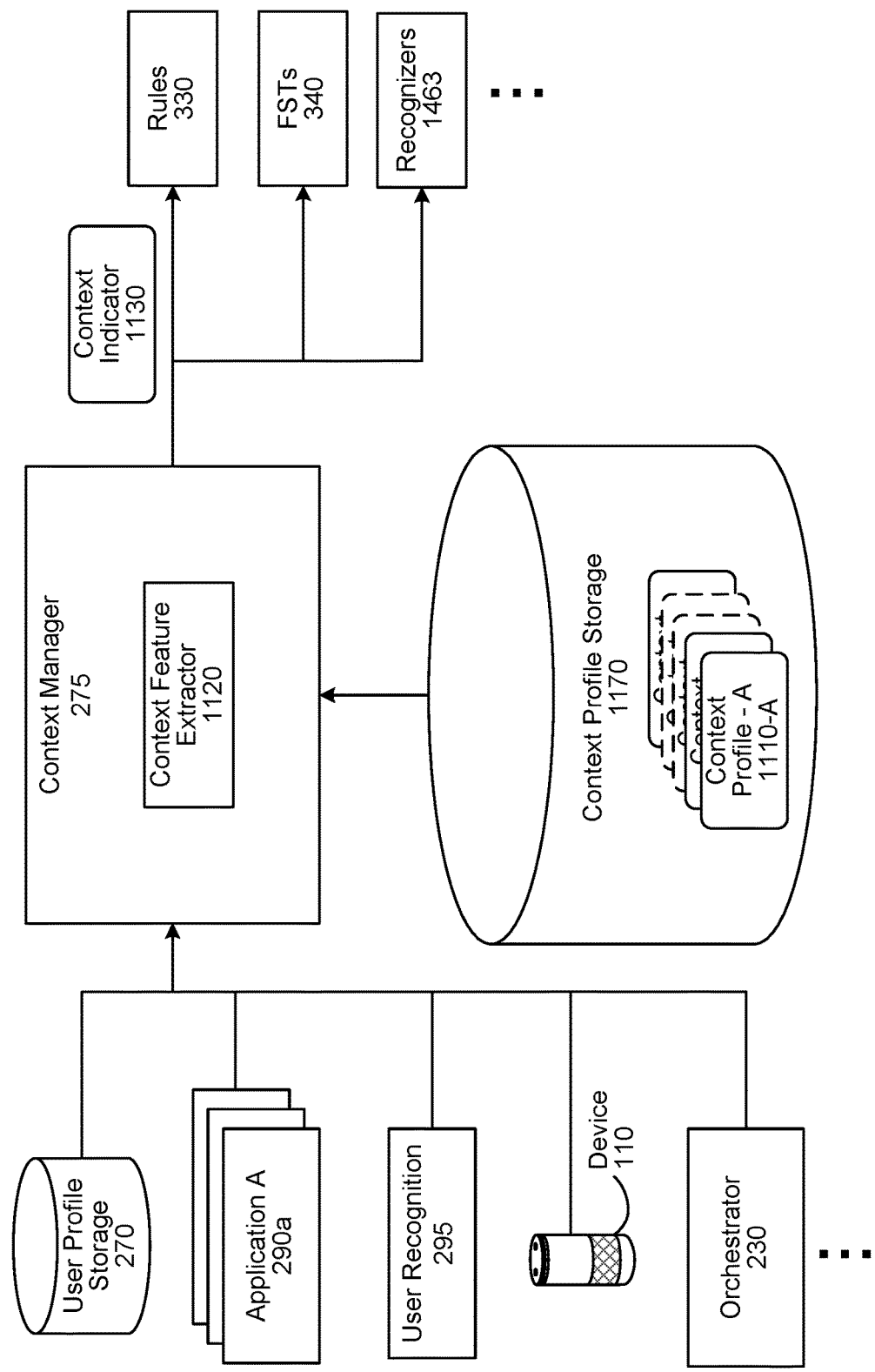
FIG. 11 illustrates operation of a context manager according to embodiments of the embodiments of the present disclosure.

Context data may be captured and processed by a component such as the context manager 275 as shown in FIG. 11. Various context data may be considered. Examples of context data include a capture device type/device model, device attribute such as hardware components of the capture device (e.g., does the device have a camera? does it have a screen? does it have a large screen? or the like), device state (e.g., is the device linked to another device that has a screen? is there an active video session associated with the device? is there an active audio session associated with the device? or the like), location information associated with the device, user information (such as demographic information associated with the user), events detected by sensors associated with the device, other individuals in the proximity of the device, or other context information.

As shown in FIG. 11, the context manager 275 may obtain context data from different components. In addition to sending audio data corresponding to an utterance, a device 110 may also send metadata identifying the device, for example a device ID, device model #, or the like. The context manager 275 may receive that metadata and determine using a lookup or other tool the device type/device capability of the device. The context manager 275 may also determine context data from the user profile 270 which may store information regarding the user (such as demographic information, affinity information, etc.) or the device (such as device type, device ID, device location, whether the device is linked to another device, etc.). The context manager 275 may also determine context data from the user recognition component 295 which may identify the user speaking in the utterance and/or may indicate if other individuals are present in the utterance. The context manager 275 may also determine context data from one or more application/skills 290 that are operating with respect to the device, such as indicating an active video session, audio session, or other application/skill specific information associated with the device. The context manager 275 may also receive context data from the orchestrator 230 or other component(s).

Figure 12:
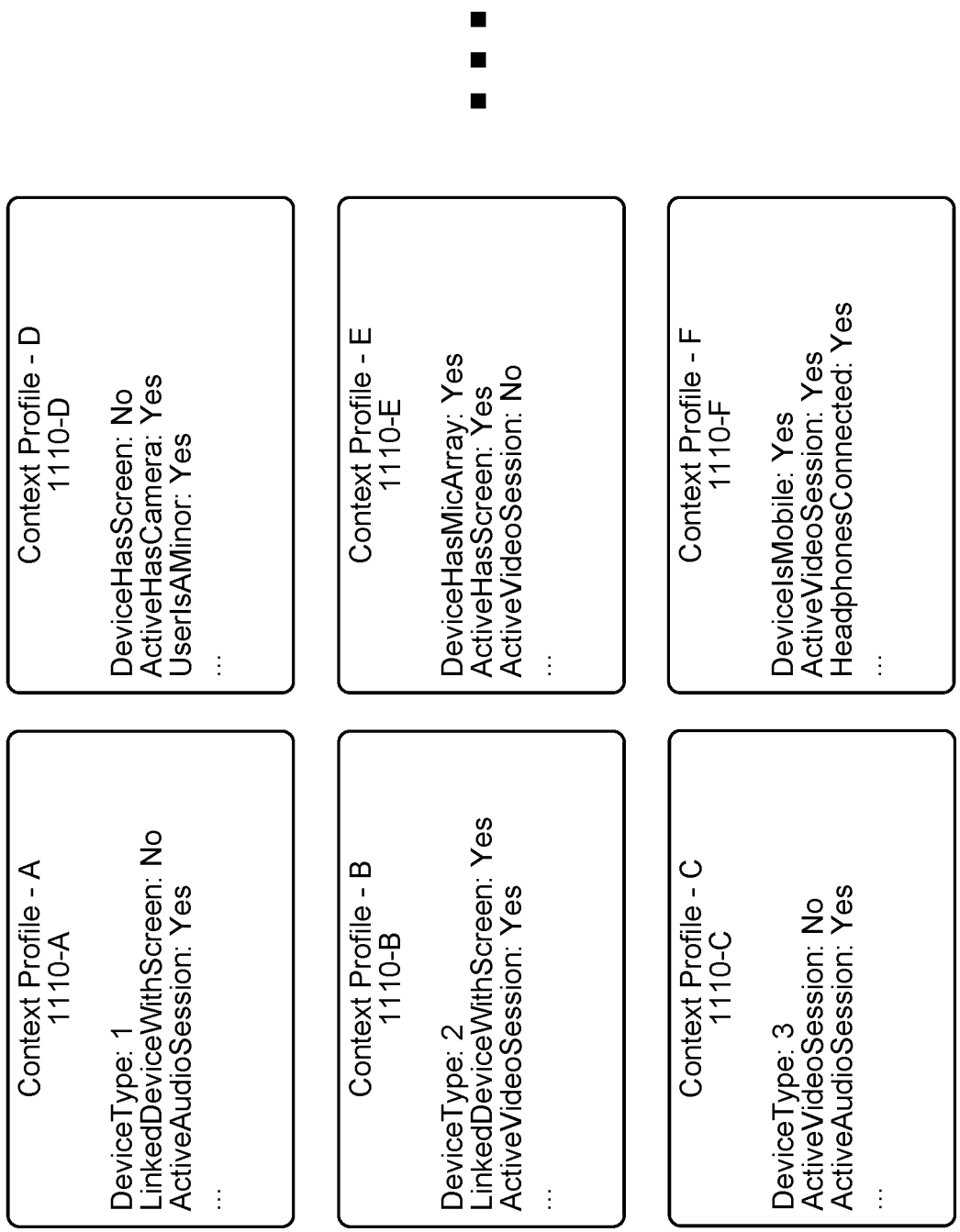
FIG. 12 illustrates example information corresponding to context profiles according to embodiments of the present disclosure.

The context manager 275 may attempt to match all the context data with a context profile 1110. Context profile data 1110 may be stored in context profile storage 1170. Other components may also access the context profile storage 1170 such as the components of FIG. 3A, etc. Each context profile 1110 may correspond to a set of context data that may indicate a particular state of the context that the system may use to bias or otherwise adjust NLU processing. The system may configure any number of context profiles as needed to ensure that different operating conditions are sufficiently represented to ensure desired NLU processing. Examples of context profiles are shown in FIG. 12. As shown, a first context profile 1110-A may correspond to when a device has device type 1, is not linked to a device with a screen but does have an active audio session. (The context profile 1110-A, and other context profiles shown in FIG. 12 may correspond to multiple items of unillustrated context data as represented by the " . . . ," but for illustration purposes only a few context data points are mentioned for each profile.) Thus, if those circumstances are true for a particular utterance, the context manager 275 will select context profile 1110-A to apply for the hypotheses of that utterance. As another example, context profile 1110-B may correspond to a situation when a device has device type 2, is linked to a device with a screen, and is associated with an active video session (for example an active video session with the linked device). Other context profiles 1110-C through 1110-F are also shown in FIG. 12, but other context profiles may also exist.

As discussed above in reference to FIG. 10, each context profile may be associated with a position subset within a feature vector. If the context manager 275 determines that a particular context profile applies to a particular utterance, the system may populate a feature vector for a hypothesis of that utterance with NLU scores located at positions within the feature vector that correspond to the context profile. For example, a particular feature vector format 1302 is illustrated. In the illustrated feature vector format a first position subset A 1320 may be associated with a first context profile 1110-A, a second position subset B 1322 may be associated with a first context profile 1110-B, a third position subset C 1324 may be associated with a first context profile 1110-C and so on, with the feature vector format 1302 being long enough to accommodate further position subsets 1330 as needed to accommodate further context profiles. Thus, if the system determines a particular context profile applies to a particular hypothesis, that hypothesis' feature values (e.g., intent score data 304, slot score data 306, domain score data EXE08, etc.) may be populated into the appropriate position subset of the feature vector corresponding to the particular context profile. As the context profiles may be exclusive, any other positon subsets of the feature vector may be set to zero. Although each subset is shown having three value positions, other numbers of value positions may be configured and different position subsets may have different numbers of positions depending on the system configuration. Further, context profiles may not necessarily be exclusive, and the system may be trained and configured such that multiple context profiles may apply to a particular hypothesis such that multiple context positions of that hypothesis' feature vector is populated at runtime.

Returning to FIG. 11, the context manager 275 may process the context data with a context feature extractor 1120 that processes the context data to extract certain features from the context data that may be needed to establish the data points for the context profiles, such as those illustrated in FIG. 12. The context features may correspond to the data points of the context profiles such as device type, whether the device is linked with another device, whether the device has an active video/audio session, whether the user is a minor, the device's hardware capabilities, etc. Based on the extracted context features the context manager 275 can then determine which context profile 1110 corresponds to the input context data. The context manager 275 may then output a context indicator 1130 to NLU components such as rules component 330, FST component 340, recognizers 1463 or other components. The context indicator 1130 may include an indicator of the selected context profile 1110, an indicator of the context data, all or a subset of the context data, or some other data.

Figure 13:
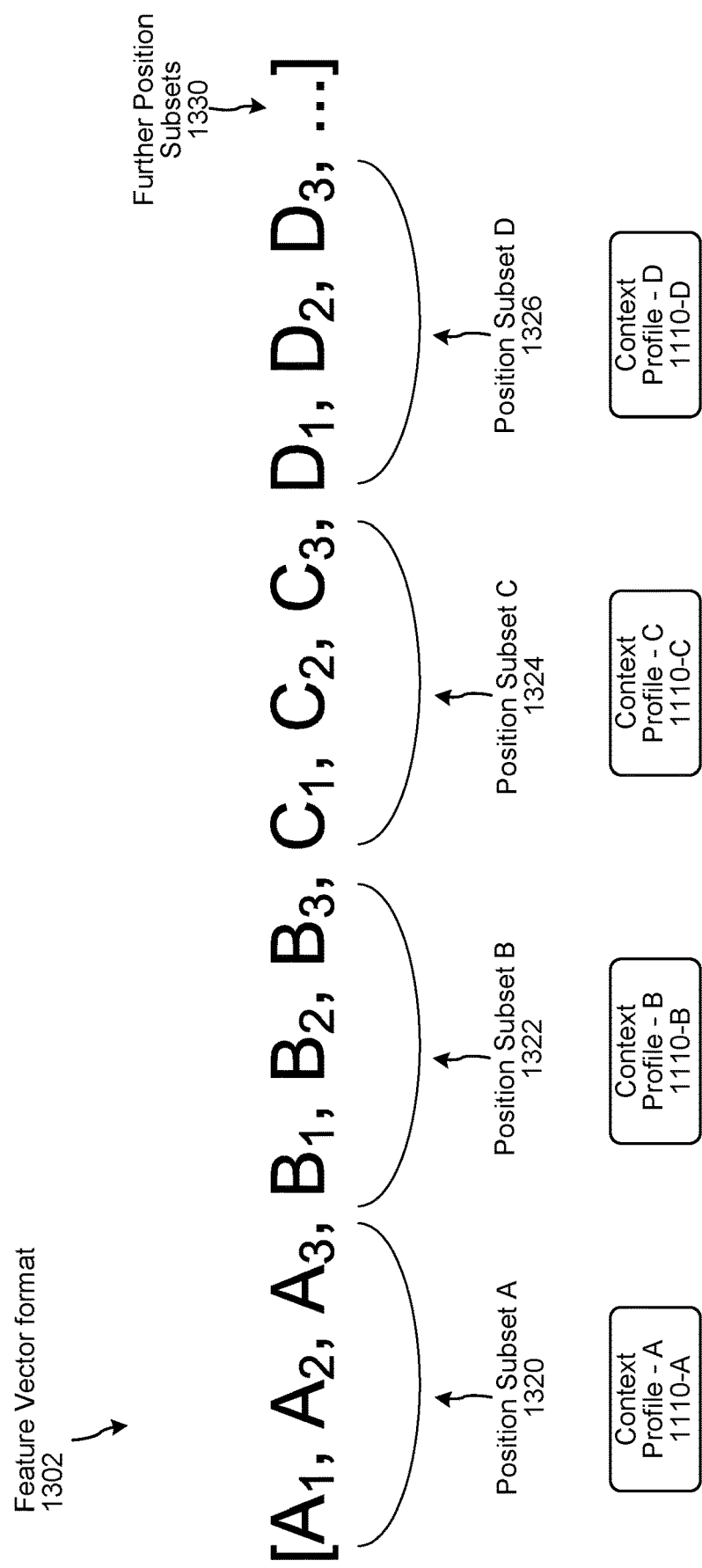
FIG. 13 illustrates an example format for a feature vector for performing NLU hypothesis scoring and ranking according to embodiments of the present disclosure.

The context manager 275 may communicate context data to the NLU component 260 so the NLU component 260 can update certain fields in a feature vector such as ensuring the NLU scores are located in the appropriate position subset of a feature vector format 1302. (e.g., fields B1, B2 and B3 for a hypothesis that corresponds to context profile 1110-B as illustrated in FIG. 13 or other appropriate fields assigned to types of other data 320 within a feature vector 402).

The context indicator 1130 may be sent from the context manager 275 to other components so they may perform processing appropriate to the determined context. For example, certain rules of the rules component 330 may be applied or given a certain priority under certain contexts. Thus the system may certain use rules to govern under what contexts certain intents should be disabled. Further, the system may also use one or more FSTs of the FST component 340 to, under certain contexts, activate paths in the FST that allow certain intents to be selected.

One benefit to the above system is that when new data is received for a particular domain (such as new intents, new utterance expressions that should be more highly weighted for the domain, new utterance expressions that should be less highly weighted for the domain, etc.), recognizer component(s) and corresponding models, rules, FSTs, etc. for the domain may be retrained independently of those for other domains. Thus the system may be more flexible regarding system updates and may be less likely to have updates to one domain negatively impacting system performance relative to another domain.

Once trained, a multi-context reranker configured to operate with the extended feature vector format 1302 can be stored by the system and executed at runtime in a manner similar to that described above with FIG. 4, only with different trained weights in the weight vector 404 and a larger feature vector 402 that conforms to feature vector format that is populated based on the received context data (which may be part of other data 320). A multi-context reranker will operate similarly to a device specific or other reranker as discussed herein. An incoming utterance is captured by a device 110, which then sends audio data 211 corresponding to the utterance to the server(s) 120. The audio data 211 is processed by the ASR component 250 to determine text data 302. Context data is determined by the context manager 275 and associated with the text data, for example by the context manager 275 passing a context indicator 1130 to the NLU component 260. The NLU component 260 may process the text data using a recognizer 1463 to determine an N-best list of NLU hypotheses each with associated respective intent, intent score 304, slot text string(s), NER score(s) 306 and domain score 308. As noted above with respect to FIG. 4, a feature vector 402 (in the format of 1302) may be constructed by the NLU component 260 for each hypothesis, where the feature vector includes the intent score 304, NER score(s) 306 and domain score 308 in a position subset of the feature vector corresponding to the context profile 1110. The feature vectors for each hypothesis of the utterance are then sent to the trained reranker 368, which processes the NLU scores and context data to determine an overall respective score for each hypothesis. Alternatively, the data may be sent to the reranker 368 and the feature vector 402 configured by the reranker 368 so the NLU scores are populated in the correct position subset. The reranker may multiply (416) the feature vector by a weight vector 404 (or by the transpose of the weight vector 404 depending on the structure and dimensionality of the weight vector 404 and feature vector 402), where each weight of the weight vector 404 corresponds to a particular location in the feature vector 402. The reranker 368 may then sum (417) the results of the multiplication to determine the overall score (419) for each respective hypothesis. The reranker 368 may then rank the hypotheses based on their respective overall scores and may output the ranked hypotheses to a downstream NLU component.

The pruning component 1450 takes the N-best list represented in the cross-domain N-best list data 1440 and creates a new, shorter N-best list (i.e., represented in cross-domain N-best list data 1460 discussed below). The items represented in the N-best list data 1440 may be sorted according to their respective calibrated/normalized scores generated by the reranker components 368 of the different recognizers 1463. Such sorting may be performed by the pruning component 1450 prior to other processes performed by the pruning component 1450 discussed hereafter.

The pruning component 1450 may perform score thresholding with respect to the cross-domain N-best list data 1440. For example, the pruning component 1450 may select items in the N-best list data 1440 associated with a score meeting and/or exceeding a score threshold. The pruning component 1450 may also or alternatively perform number of item thresholding. For example, the pruning component 1450 may select the top scoring item(s) associated with each different domain represented in the N-best list data 1440, with the new N-best list including a total number of items meeting or falling below a threshold number of items. The purpose of the pruning component 1450 is to create a new list of top scoring textual interpretations and data corresponding thereto (e.g., data indicating one or more intents, data indicating slots, etc.), so that downstream (more resource intensive) processes may only operate on the top choices.

As an example of a multi-domain N-best list created by the cross-domain ranker 1450, take the example text interpretation of "play the hunger games." The textual interpretation may be processed by each domain recognizer 1463, and each domain may output an N-best list, resulting in the group of N-best lists represented in the cross-domain N-best list data 1440 input into the cross-domain processing component 1455. The cross-domain ranker 1450 may rank the individual items among the N-best lists to create a new N-best list. For example, the cross-domain ranker 1450 may output NLU data in the form of an N-best list such as:

[0.78] Video PlayVideoIntent VideoName: The Hunger Games

[0.13] Books ReadBookIntent BookName: The Hunger Games

[0.07] Music PlayMusicIntent AlbumName: Hunger Games where the top items from different N-best lists from multiple domains are grouped into a single N-best list 1460. As shown, the top scoring item is from a video domain recognizer 1463, and includes the intent "playvideointent" and a slot labeled as video name corresponding to the text "the hunger games." The next item is from a books domain recognizer 1463, and includes the intent "readbookintent" and a slot labeled as book name corresponding to the text "the hunger games." The next item is from a music domain recognizer 1463, and includes the intent "playmusicintent" and a slot labeled as album name corresponding to the text "hunger games." Each item in the cross-domain N-best list 1460 may also include a score. The size of the cross-domain N-best list 1460 is configurable.

The cross-domain processing component 1455 may also include a light slot filler component 1452. The light slot filler component 1452 can take text from slots and alter it to make the text more easily processed by downstream components. The operations of the light slot filler component 1452 are typically low latency operations that do not involve heavy operations such as reference to a knowledge base. The purpose of the light slot filler component 1452 is to replace words with other words or values that may be more easily understood by downstream components. For example, if a textual interpretation represented in the text data 302 included the word "tomorrow," the light slot filler component 1452 may replace the word "tomorrow" with an actual date for purposes of downstream processing. Similarly, a word "CD" may be replaced by a word "album" of the words "compact disc." The replaced words are then included in the cross-domain N-best list data 1460.

The cross-domain N-best list data 1460 is then sent to an entity resolution component 1470. The entity resolution component 1470 can apply rules or other instructions to standardize labels or tokens from previous stages into an intent/slot representation. The precise transformation may depend on the domain (e.g., for a travel domain a text mention of "Boston airport" may be transformed to the standard BOS three-letter code referring to the airport). The entity resolution component 1470 can refer to an authority source (such as a knowledge base) that is used to specifically identify the precise entity referred to in the entity mention identified in each slot represented in the cross-domain N-best list data 1460. Specific intent/slot combinations may also be tied to a particular source, which may then be used to resolve the text. In the example "play songs by the stones," the entity resolution component 1470 may reference a personal music catalog, Amazon Music account, user profile, or the like. The output from the entity resolution component 1470 may include an altered N-best list that is based on the cross-domain N-best list represented in the cross-domain N-best list data 1460, but also includes more detailed information (e.g., entity IDs) about the specific entities mentioned in the slots and/or more detailed slot data that can eventually be used by an application 290 which may be incorporated into the same system components or pipeline or may be on a separate device in communication with the system. Multiple entity resolution components 1470 may exist where a particular entity resolution component 1470 may be specific to one or more domains.

The entity resolution component 1470 may not necessarily be successful in resolving every entity and filling every slot represented in the N-best list represented in the cross-domain N-best list data 1460. This may result in incomplete results being output by the entity resolution component 1470. A final ranker component 1490 may consider such errors when determining how to rank the ultimate results for potential execution. For example, if an item of the cross-domain N-best list data 1460 comes from a book domain and includes a read book intent, but the entity resolution component 1470 cannot find a book with a title matching the text of the item, that particular result may be re-scored by the final ranker component 1490 to be given a lower score. Each item considered by the final ranker component 1490 may also be assigned a particular confidence, where the confidence may be determined by a reranker component 368, the cross-domain processing component 1455, or by the final ranker component 1490 itself. Those confidence scores may be used to determine how to rank the individual NLU results represented in the N-best list input into the final ranker component 1490. The confidence scores may be affected by unfilled slots. For example, if one domain is capable of filling a slot (i.e., resolving a word in the slot to an entity or other recognizable form) for a textual interpretation, the results from that domain may have a higher confidence than results from a different domain that is not capable of filling a slot.

The final ranker component 1490 may be configured to apply re-scoring, biasing, or other techniques to obtain the most preferred ultimate result. To do so, the final ranker component 1490 may consider not only the NLU results of the N-best list input thereto, but may also consider other data

1491. The other data 1491 may include a variety of information such as context data discussed above or other information. For example, the other data 1491 may include application rating or popularity data. For example, if one application has a particularly high rating, the final ranker component 1490 may increase the score of results associated with that particular application. The other data 1491 may also include information about applications that have been specifically enabled by the user (as indicated in a user profile). NLU results from enabled applications may be scored higher than results from non-enabled applications. User history may also be considered, such as if the user regularly uses a particular supplemental application or does so at particular times of day. Date, time, location, weather, type of device 110, user ID, context, and other information may also be considered. For example, the final ranker component 1490 may consider when any particular applications are currently active (e.g., music being played, a game being played, etc.). The highest scoring result (or results in the case of multiple textual interpretations corresponding to multiple intents) may be passed to a downstream application 290 for execution.

The final ranker 1490 (or other component) may also consider filtering of NLU hypotheses that include certain intents based on the context data, such as the data determined by the context manager 275.

Following final ranking, the NLU component 260 may output NLU output data 1485. The NLU output data 1485 may include an indicator of the intent of the utterance along with data associated with the intent, for example an indication that the intent is "play music" and the music to be played is "Adele." The NLU output data 1485 may be in the form of previous NLU data such as an item(s) in the recognizer output data 310, cross-domain N-best list data 1440, an item(s) in the cross-domain N-best list data 1460, or the like. The NLU output data 1485 may also be in a format executable by the application 290. Multiple instances of NLU output data (e.g., 1485a-1485n) may also be output for a given utterance. Thus, using the techniques described here, the NLU component 260 may select the highest scoring NLU hypothesis and may send it to the corresponding application 290 that can execute the intent of the NLU hypothesis.

The application(s) 290 then provides the server(s) 120 with content responsive to the NLU output data 1485. If the content is text data that needs to be converted to speech, the text data is sent to a TTS component 280. In addition or alternatively to the text data output by the application 290 being sent to the TTS component 280, the text data may be inserted into an email, text message, or card for display to a user.

Various machine learning techniques may be used to perform the training of various models used by the above components. For example, components of recognizer 1463 may use various trained models. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account context information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 15:
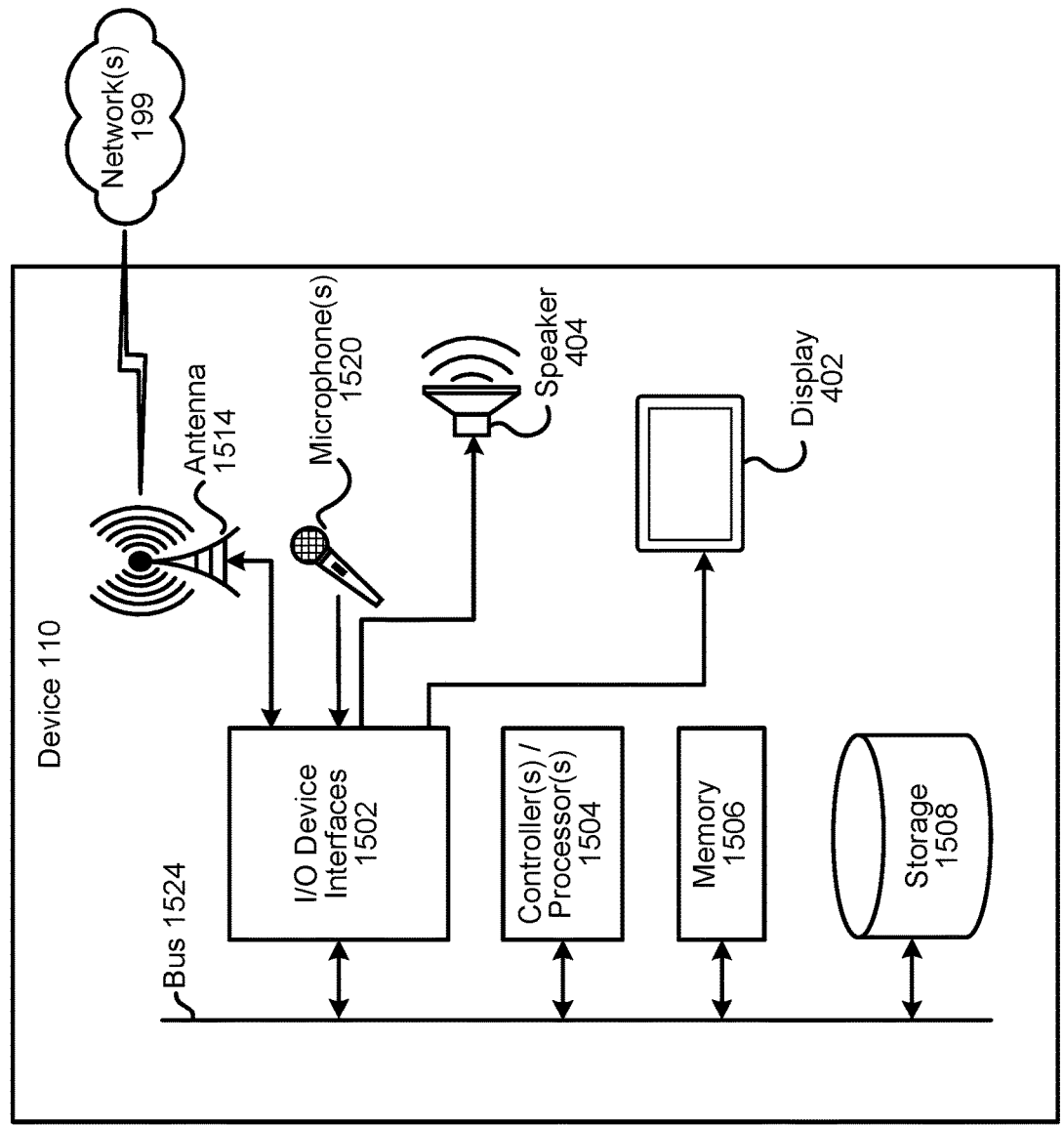
FIG. 15 is a block diagram conceptually illustrating example components of a device according to embodiments of the present disclosure.
Figure 16:
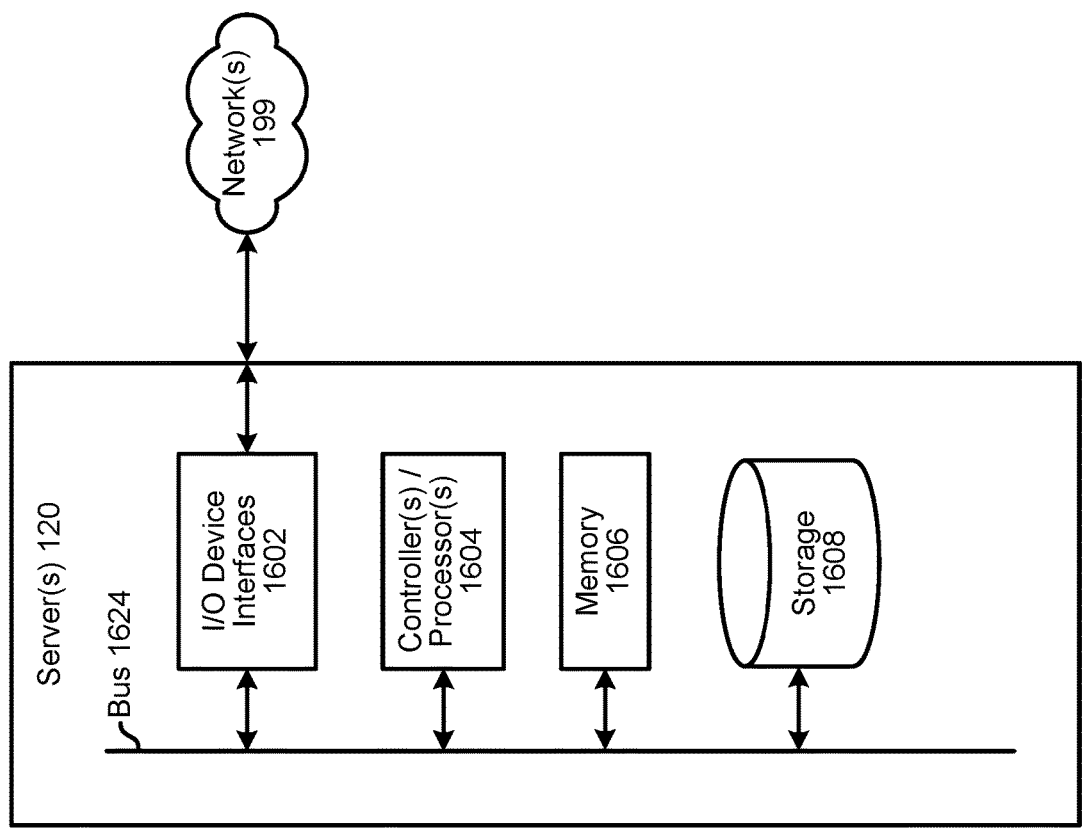
FIG. 16 is a block diagram conceptually illustrating example components of a server according to embodiments of the present disclosure.

FIG. 15 is a block diagram conceptually illustrating a user device 110 that may be used with the described system 100. FIG. 16 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1502/1602).

Computer instructions for operating each device (110/120) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120) includes input/output device interfaces (1502/1602). A variety of components may be connected through the input/output device interfaces (1502/1602), as will be discussed further below. Additionally, each device (110/120) may include an address/data bus (1524/1624) for conveying data among components of the respective device. Each component within a device (110/120) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may further include a display 1510 configured to display content.

Via antenna(s) 1514, the input/output device interfaces 1502 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (1502/1602) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (1502/1602), processor(s) (1504/1604), memory (1506/1606), and/or storage (1508/1608) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are exemplary, and may be located as a stand-alone device or may be included, in whole or in part, as a component of a larger device or system.

Figure 17:
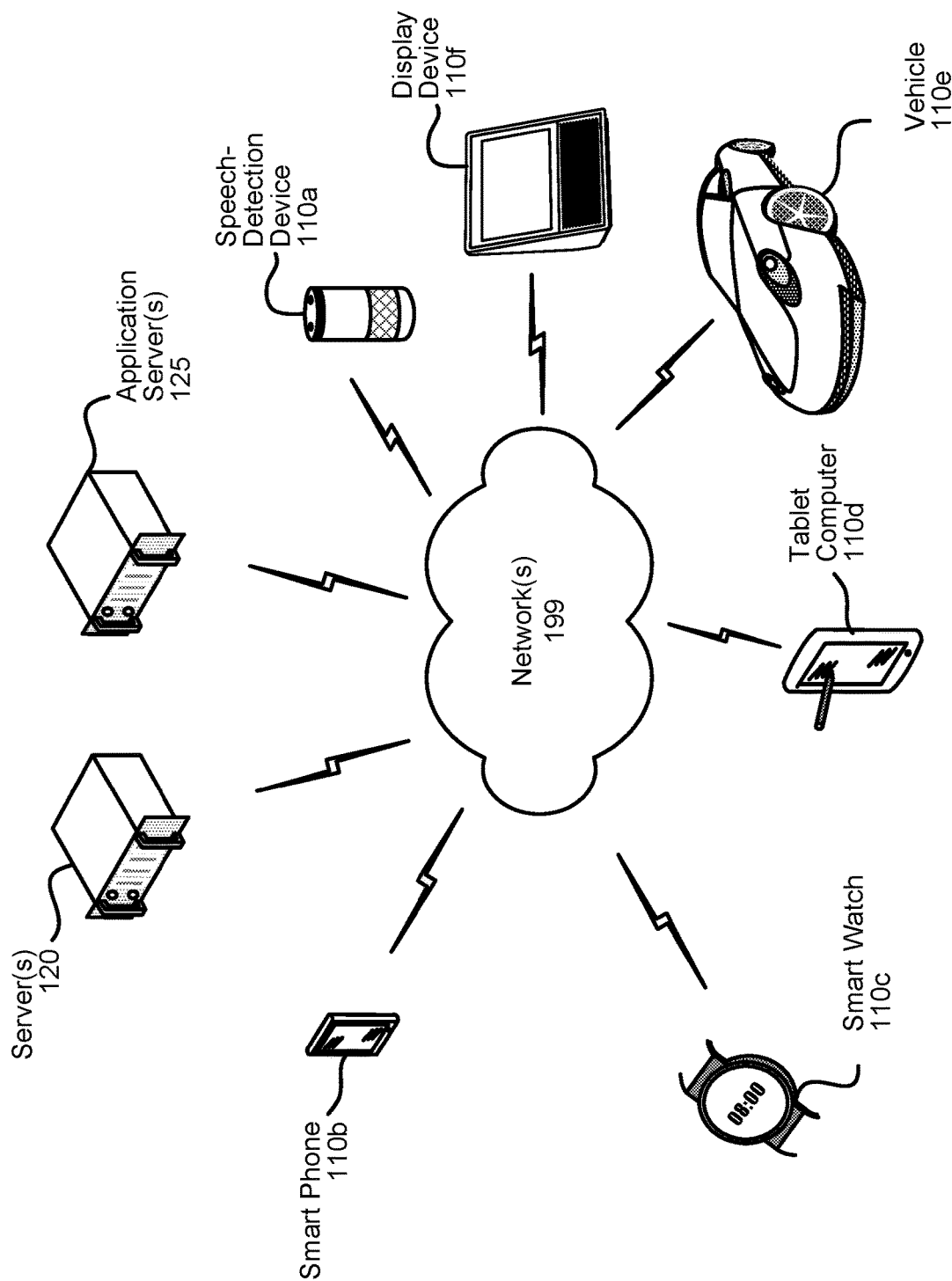
FIG. 17 illustrates an example of a computer network for use with the speech processing system.

As illustrated in FIG. 17, multiple devices (110a-110f, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, and/or a display device 110f may be connected to the network(s) 199 through a wireless service provider, over a WiFi or cellular network connection, or the like. Other devices are included as network-connected support devices, such as the server(s) 120, the application server(s) 125, or others. The support devices may connect to the network(s) 199 through a wired connection or wireless connection. Networked devices may capture audio using one-or-more built-in or connected microphones or other audio capture devices, with processing performed by ASR, NLU, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first device, input audio data corresponding to an utterance;
   performing speech recognition processing on the input audio data to generate text data representing the utterance;
   determining a natural language hypothesis representing a potential interpretation of the text data, wherein determining the natural language hypothesis comprises:
      processing the text data using an intent classifier to generate an intent score representing a likelihood that an intent corresponds to the text data,
      processing the text data using a named entity recognition (NER) model to identify a portion of the text data potentially relevant to the intent,
      processing the text data using the NER model to generate a NER score indicating a likelihood the text data is relevant to the intent, and
      processing the text data using a domain classification model to generate a domain score representing a likelihood that the text data corresponds to a domain;
   determining a device type of the first device;
   determining a feature vector comprising the intent score, the NER score and the domain score, wherein:
      the intent score is located at a first position in the feature vector, the first position corresponding to at least the device type,
      the NER score is located at a second position in the feature vector, the second position corresponding to at least the device type, and
      the domain score is located at a third position in the feature vector, the third position corresponding to at least the device type;
   sending the feature vector to a log linear model component comprising a weight vector, the weight vector comprising a plurality of weights, wherein the plurality of weights comprises:
      a first weight corresponding to the first position,
      a second weight corresponding to the second position, and
      a third weight corresponding to the third position;
   multiplying the intent score by the first weight to determine a weighted intent score;
   multiplying the NER score by the second weight to determine a weighted NER score;
   multiplying the domain score by the third weight to determine a weighted domain score;
   determining a new score for the natural language hypothesis using at least the weighted intent score, the weighted NER score and the weighted domain score; and
   causing a command corresponding to the intent to be executed.

2. The computer-implemented method of claim 1, further comprising:
   receiving, from the first device, a device identifier;
   identifying, in a user profile, the device type using the device identifier;
   determining the first position, the second position, and the third position using the device type;
   populating the feature vector with the intent score in the first position, the NER score in the second position and the domain score in the third position;
   determining a plurality of other positions in the feature vector corresponding to other device types; and
   populating each of the plurality of other positions with a value of zero.

3. The computer-implemented method of claim 1, further comprising:
   determining context data corresponding to the utterance, the context data including data corresponding to hardware components corresponding to a device type;
   determining the first device is associated with a second device corresponding to a different device type;
   determining the second device is displaying video during the utterance;
   determining a context profile corresponding to the displaying of video and the device type;
   determining that the first position, the second position, and the third position correspond to the context profile;
   determining a fourth position in the feature vector corresponding to data second context profile; and
   populating the fourth position with a value of zero.

4. A system comprising:
   at least one processor; and
   at least one memory including instructions that, when executed by the at least one processor, cause the system to:
      receive, from a device, a device identifier of the device and input data corresponding to a user input;
      process text data representing the input data to determine a first plurality of scores for a first natural language hypothesis corresponding to the input data;
      determine, based on at least the device identifier, that the input data corresponds to a first context profile;
      populate a first feature vector with the first plurality of scores, the first plurality of scores being at a first plurality of positions in the first feature vector, the first plurality of positions corresponding to the first context profile, wherein a second plurality of positions in the first feature vector corresponds to a second context profile;
      multiply the first feature vector by a weight vector including a first plurality of weights associated with the first context profile and a second plurality of weights associated with a second context profile to determine first result data;
      determine a first new score for the first natural language hypothesis using the first result data; and
      select the first natural language hypothesis for further operations based at least in part on the first new score.

5. The system of claim 4, the memory further comprising instructions that, when executed by the at least one processor, further cause the system to:
   process the text data using a first model to determine an intent score representing a likelihood that an intent corresponds to the text data;

process the text data using a second model to determine a named entity recognition (NER) score indicating a likelihood the text data is relevant to the intent;
process the text data using a third model to determine a domain score representing a likelihood that the text data corresponds to a domain; and
include in the first plurality of scores the intent score, the NER score and the domain score.

6. The system of claim 4, the memory further comprising instructions that, when executed by the at least one processor, further cause the system to:
determine a second plurality of scores for a second natural language hypothesis corresponding to the input data;
populate a second feature vector using the second plurality of scores and the first context profile;
multiply the second feature vector by the first plurality of weights to determine third result data;
determine a second new score for the second natural language hypothesis using the third result data; and
determine the first new score is higher than the second new score.

7. The system of claim 4, wherein the memory further comprises instructions that, when executed by the at least one processor, further cause the system to:
determine a first subset of the first feature vector corresponding to the first context profile; and
populate the first subset of the first feature vector with the first plurality of scores.

8. The system of claim 7, wherein the memory further comprises instructions that, when executed by the at least one processor, further cause the system to:
determine a plurality of other subsets in the first feature vector corresponding to other context profiles; and
populate each of the plurality of other subsets with a value of zero.

9. The system of claim 7, wherein:
the first plurality of weights is trained using a plurality of training utterances corresponding to the first context profile.

10. The system of claim 4, wherein the memory further comprises instructions that, when executed by the at least one processor, further cause the system to:
determining the first context profile corresponds to at least one processing rule; and
select the first natural language hypothesis further using the at least one processing rule.

11. The system of claim 4, wherein the memory further comprises instructions that, when executed by the at least one processor, further cause the system to:
receive, from an application component, first data indicating media content being sent from the application component to the device during a time the system receives the input data, wherein determining that the input data corresponds to the first context profile is additionally based on the first data.

12. The system of claim 4, wherein the first plurality of weights are determined during a first training operation using utterance training data corresponding to a first context profile and the second plurality of weights are determined during a second training operation using utterance training data corresponding to a second context profile.

13. The system of claim 4, wherein:
the input data is audio data corresponding to an utterance; and
the memory further comprises instructions, that when executed by the at least one processor, further cause the system to:
perform speech recognition processing on the audio data to generate the text data, and
determine the first natural language hypothesis based on the text data.

14. The system of claim 4, wherein the first context profile comprises data representing one or more of a device type, a hardware capability, or a device state, and determining that the input data corresponds to the first context profile is additionally based on the device corresponding to the one or more of the device type, the hardware capability, or the device state.

15. The system of claim 4, wherein the user input is an utterance and the input data includes audio data.

16. The system of claim 4, wherein:
the first plurality of weights are included in a weight vector; and
the weight vector was determined by:
processing probability data corresponding to a training natural language hypothesis to generate modified probability data, the training natural language hypothesis corresponding to the first context profile;
processing the modified probability data to generate the first plurality of weights, the first plurality of weights comprising at least a first weight and a second weight; and
generating the weight vector to include the first weight at a first position and the second weight at a second position, the first position and the second position corresponding to the first context profile.

17. The system of claim 4, wherein the memory further comprises instructions that, when executed by the at least one processor, further cause the system to:
populate the weight vector by locating the first plurality of weights at a third plurality of positions in the weight vector corresponding to the first context profile and locating the second plurality of weights at a fourth plurality of positions in the weight vector corresponding to the second context profile.

18. The system of claim 17, wherein:
determining the first result data includes determining a dot product of the first feature vector and the weight vector.

19. A computer-implemented method comprising:
receiving, from a device, a device identifier of the device and input data corresponding to a user input;
processing text data representing the input data to determine a first plurality of scores for a first natural language hypothesis corresponding to the input data;
determining, based on at least the device identifier, that the input data corresponds to a first context profile;
populating a first feature vector with the first plurality of scores, the first plurality of scores being at a first plurality of positions in the first feature vector, the first plurality of positions corresponding to the first context profile, wherein a second plurality of positions in the first feature vector corresponds to a second context profile;
multiplying the first feature vector by a weight vector including a first plurality of weights associated with the first context profile and a second plurality of weights associated with a second context profile to determine first result data;
determining a first new score for the first natural language hypothesis using the first result data; and
selecting the first natural language hypothesis for further operations based at least in part on the first new score.

20. The computer-implemented method of claim 19, further comprising:
- processing the text data using a first model to determine an intent score representing a likelihood that an intent corresponds to the text data;
- processing the text data using a second model to determine a named entity recognition (NER) score indicating a likelihood the text data is relevant to the intent;
- processing the text data using a third model to determine a domain score representing a likelihood that the text data corresponds to a domain; and
- including in the first plurality of scores the intent score, the NER score and the domain score.

21. The computer-implemented method of claim 19, further comprising:
- determining a second plurality of scores for a second natural language hypothesis corresponding to the input data;
- populating a second feature vector using the second plurality of scores and the first context profile;
- multiplying the second feature vector by the first plurality of weights to determine third result data;
- determining a second new score for the second natural language hypothesis using the third result data; and
- determining the first new score is higher than the second new score.

22. The computer-implemented method of claim 19, further comprising:
- determining a first subset of the first feature vector corresponding to the first context profile; and
- populating first subset of the first feature vector with the first plurality of scores.

23. The computer-implemented method of claim 22, further comprising:
- determining a plurality of other subsets in the first feature vector corresponding to other context profiles; and
- populating each of the plurality of other subsets with a value of zero.

24. The computer-implemented method of claim 22, wherein:
- the first plurality of weights is trained using a plurality of training utterances corresponding to the first context profile.

25. The computer-implemented method of claim 19, further comprising:
- receiving, from an application component, first data indicating media content being sent from the application component to the device during a time the input data was received, wherein determining that the input data corresponds to the first context profile is additionally based on the first data.

26. The computer-implemented method of claim 19, wherein the first plurality of weights are determined during a first training operation using utterance training data corresponding to a first context profile and the second plurality of weights are determined during a second training operation using utterance training data corresponding to a second context profile.

27. The computer-implemented method of claim 19, wherein:
- the input data is audio data corresponding to an utterance; and
- the computer-implemented method further comprises:
  - performing speech recognition processing on the audio data to generate the text data, and
  - determining the first natural language hypothesis based on the text data.

28. The computer-implemented method of claim 19, wherein the first context profile comprises data representing one or more of a device type, a hardware capability, or a device state, and determining that the input data corresponds to the first context profile is additionally based on the device corresponding to the one or more of the device type, the hardware capability, or the device state.

29. The computer-implemented method of claim 19, wherein the user input is an utterance and the input data includes audio data.

30. The computer-implemented method of claim 19, wherein:
- the first plurality of weights are included in a weight vector; and
- the weight vector was determined by:
  - processing probability data corresponding to a training natural language hypothesis to generate modified probability data, the training natural language hypothesis corresponding to the first context profile;
  - processing the modified probability data to generate the first plurality of weights, the first plurality of weights comprising at least a first weight and a second weight; and
  - generating the weight vector to include the first weight at a first position and the second weight at a second position, the first position and the second position corresponding to the first context profile.

31. The computer-implemented method of claim 19, further comprising:
- populating the weight vector by locating the first plurality of weights at a third plurality of positions in the weight vector corresponding to the first context profile and locating the second plurality of weights at a fourth plurality of positions in the weight vector corresponding to the second context profile.

32. The computer-implemented method of claim 31, wherein:
- determining the first result data includes determining a dot product of the first feature vector and the weight vector.

* * * * *